US012659074B2

(12) United States Patent
Zhang et al.

(10) Patent No.: US 12,659,074 B2
(45) Date of Patent: Jun. 16, 2026

(54) COMMUNICATION METHOD, APPARATUS, AND SYSTEM

(71) Applicant: SHENZHEN YINWANG INTELLIGENT TECHNOLOGIES CO., LTD., Shenzhen (CN)

(72) Inventors: Xingxin Zhang, Chengdu (CN); Pengxin Bao, Chengdu (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/673,590

(22) Filed: May 24, 2024

(65) Prior Publication Data

US 2024/0333422 A1     Oct. 3, 2024

Related U.S. Application Data

(63) Continuation of application No. PCT/CN2021/133256, filed on Nov. 25, 2021.

(51) Int. Cl.
H04L 1/00          (2006.01)
H04L 1/20          (2006.01)

(52) U.S. Cl.
CPC .......... H04L 1/0043 (2013.01); H04L 1/0057 (2013.01); H04L 1/203 (2013.01)

(58) Field of Classification Search
CPC ........................ H04L 2027/0057; H04L 1/203
See application file for complete search history.

(56) References Cited

U.S. PATENT DOCUMENTS

| | | | | |
|---|---|---|---|---|
| 6,851,086 | B2 * | 2/2005 | Szymanski | ........... H03M 13/09 |
| | | | | 714/781 |
| 7,162,676 | B2 * | 1/2007 | Coleman | ............. H03M 13/353 |
| | | | | 714/704 |
| 10,236,907 | B2 * | 3/2019 | Szczepanek | ........ H03M 13/015 |
| 10,644,792 | B2 * | 5/2020 | Maccaglia | .............. H04L 1/203 |

(Continued)

FOREIGN PATENT DOCUMENTS

| | | |
|---|---|---|
| CN | 113497674 A | 10/2021 |
| JP | 2002544731 A | 12/2002 |

(Continued)

OTHER PUBLICATIONS

SA WG2, Reply LS on SR-VCC from LTE to UMTS, 3GPP TSG RAN WG2 Meeting #75 Athens, Greece, Aug. 22-26, 2011, R2-113734, total 1 page.

(Continued)

*Primary Examiner* — Esaw T Abraham
(74) *Attorney, Agent, or Firm* — Conley Rose, P.C.

(57)     ABSTRACT

A communication method includes: sending a first sequence including P subsequences A to a first device, where the first sequence is used by the first device to count a first bit error rate (BER), and the subsequence A is constituted by one or more forward error correction (FEC) code blocks; and sending a second sequence including Q subsequences B to the first device, where the second sequence is used by the first device to count a second BER, the subsequence B is constituted by one or more FEC code blocks, a length of the second sequence is greater than or equal to a length of the first sequence, and P and Q are positive integers.

20 Claims, 8 Drawing Sheets

(56) References Cited

U.S. PATENT DOCUMENTS

| | | | | |
|---|---|---|---|---|
| 11,050,527 | B1 * | 6/2021 | Pepper | H04L 1/0072 |
| 11,228,380 | B2 * | 1/2022 | Heinen | H04B 17/0085 |
| 11,394,490 | B1 * | 7/2022 | Pan | H04L 1/0618 |
| 11,799,500 | B2 * | 10/2023 | Schedelbeck | H03M 13/2984 |
| 12,074,644 | B2 * | 8/2024 | Van Veen | H04B 10/07953 |
| 12,395,277 | B2 * | 8/2025 | Kanamarlapudi | H04L 1/004 |
| 2018/0123613 | A1 | 5/2018 | Szczepanek et al. | |

FOREIGN PATENT DOCUMENTS

| | | | |
|---|---|---|---|
| JP | 2010028629 | A | 2/2010 |
| JP | 2020120249 | A | 8/2020 |

OTHER PUBLICATIONS

Takeshi Suehiro et al, A consideration of BER estimation method using FLR for 10G-EPON system, Information Technology RandD Cencer, Mitsubishi Electric Corporation, Aug. 30, 2011, total 3 page, with english translation.

* cited by examiner

FEC code block construction

| Data element sequence | Redundant element sequence |
|---|---|

COMMUNICATION METHOD, APPARATUS, AND SYSTEM

CROSS-REFERENCE TO RELATED APPLICATIONS

This is a continuation of International Patent Application No. PCT/CN2021/133256 filed on Nov. 25, 2021, which is hereby incorporated by reference in its entirety.

TECHNICAL FIELD

Embodiments of this disclosure relate to the field of communication technologies, and in particular, to a communication method, apparatus, and system.

BACKGROUND

Performance of a transmission chip is critical to a data transmission rate. Therefore, the performance of the transmission chip needs to be tested frequently. A bit error rate (BER) is an important index of the transmission chip. A BER test may be performed on the transmission chip to verify whether the transmission chip reaches a specified BER index.

During actual application, there is often an asymmetric transmission scenario in which an uplink rate is not equal to a downlink rate. For example, in a vehicle-mounted high-definition camera, an uplink rate (in an output direction of image data of the camera) of a transmission chip usually reaches 1 gigabit per second (Gbps) to 10 Gbps, but a downlink rate is usually only 1 megabit per second (Mbps) to 100 Mbps.

Therefore, how to design a BER test method for a transmission chip in the asymmetric transmission scenario is an urgent problem to be resolved.

SUMMARY

This disclosure provides a communication method, apparatus, and system, to perform a BER test on a transmission chip in an asymmetric transmission scenario.

The communication method provided in this disclosure may be performed by a second device. The second device may be used as test equipment (TE). The second device may be abstracted as a computer system. The second device may be an entire system, or may be a part of components in an entire system, for example, a system chip or a processing chip. The system chip may also include a system-on-chip (, SOC) or an SoC chip. Further, the second device may be an independent apparatus configured to perform a BER test on a device under test, or the second device may be a component configured to perform a BER test on a device under test in an entire system. For example, the second device may be a terminal apparatus or a vehicle-mounted device like a vehicle-mounted computer or a head unit that has a BER test function, or may be a system chip, a decision processing chip, or another type of chip that can be disposed in a computer system of a vehicle or a vehicle-mounted device and that has a BER test function.

According to a first aspect, an embodiment of this disclosure provides a communication method, including sending a first sequence to a first device, where the first sequence is used by the first device to count a first BER, the first sequence includes P subsequences A, and the subsequence A is constituted by one or more forward error correction (FEC) code blocks, and sending a second sequence to the first device, where the second sequence is used by the first device to count a second BER, the second sequence includes Q subsequences B, the subsequence B is constituted by one or more FEC code blocks, a length of the second sequence is greater than or equal to a length of the first sequence, and P and Q are positive integers.

In an example, in an asymmetric transmission scenario, when the method is performed by a second device, the first sequence and the second sequence may be separately sent. For example, the second device may first send the first sequence to the first device, and then send the second sequence to the first device.

In another example, in an asymmetric transmission scenario, when the method is performed by a second device, the first sequence and the second sequence may be sent at the same time. For example, the second device sends first information to the first device, where the first information includes the first sequence and the second sequence.

According to the method, in a BER test in this disclosure, an FEC code block used by a device for transmission is effectively used as a minimum repetition unit of the first sequence and the second sequence, so that complexity of constructing a test sequence by the device is reduced, and robustness of a test process is improved. Further, when the length of the second sequence is greater than the length of the first sequence, time of a function test based on the first sequence can be effectively shortened, and a test speed can be improved. In the asymmetric transmission scenario, this method can be used to perform a unidirectional BER test. This can simplify a test process and test time, and improve test efficiency. It may be understood that this test method may also be applied to a symmetric transmission scenario.

In a possible design, when the first BER meets a first preset BER, the second sequence is sent to the first device.

In an example, the first preset BER may be a specific value. When the first preset BER is a specific value, and the first BER is equal to the first preset BER, it is determined that the first BER meets the first preset BER. Alternatively, when the first preset BER is a specific value, and the first BER is within a floating range that is based on the first preset BER, it is determined that the first BER meets the first preset BER. For example, a left boundary of the floating range based on the first preset BER may be obtained by subtracting a first value from the first preset BER, and a right boundary of the floating range based on the first preset BER may be obtained by adding a second value to the first preset BER. The first value and the second value may be equal or unequal, and both are positive numbers. For another example, a left boundary of the floating range based on the first preset BER may be obtained by multiplying the first preset BER by a first proportion, and a right boundary of the floating range based on the first preset BER may be obtained by multiplying the first preset BER by a second proportion. The second proportion is greater than the first proportion, and both are positive numbers.

In an example, the first preset BER may alternatively be a value range. When the first preset BER is a value range, and the first BER is within the value range of the first preset BER, it is determined that the first BER meets the first preset BER.

It may be understood that in the method, a case in which the second device is triggered to send the second sequence to the first device in the asymmetric transmission scenario is provided. For example, when it is determined that the first BER obtained by the first device through counting based on the received first sequence meets the first preset BER, it is considered that the first device has an accurate error detection and counting capability, so that it can be better ensured that a result of a subsequent performance test performed by the first device based on the second sequence is accurate and reliable. Therefore, the second device may be triggered to send the second sequence to the first device.

In this disclosure, when it is determined whether the first BER counted by the first device based on the received first sequence meets the first preset BER, test personnel may manually determine whether the first BER counted by the first device based on the received first sequence meets the first preset BER. When determining that the first BER meets the first preset BER, the test personnel manually trigger the second device to send the second sequence to the first device. Alternatively, in this disclosure, when it is determined whether the first BER counted by the first device based on the received first sequence meets the first preset BER, after the first device obtains the first BER through counting based on the received first sequence, the first device may transmit the first BER back to the second device, so that the second device determines whether the received first BER meets the first preset BER. When determining that the first BER meets the first preset BER, the second device is triggered to send the second sequence to the first device.

In a possible design, the subsequence A includes N bits, the subsequence A includes M abnormal bits, and M or a ratio of M to N corresponds to the first preset BER, where N and M are positive integers, and N is greater than or equal to M. Therefore, this disclosure provides a constitution manner of the subsequence A.

It may be understood that in this embodiment of this disclosure, that M corresponds to the first preset BER means that when different first preset BERs need to be met, test equipment may flexibly set the first preset BER by adjusting a value of M in the subsequence A. For example, when the value of M in the subsequence A is M1, a corresponding first preset BER is a BER 1, and when the value of M in the subsequence A is M2, a corresponding first preset BER is a BER 2. When the test equipment wants to set the first preset BER to the BER 1, the value of M in the subsequence A may be adjusted to M1.

In this embodiment of this disclosure, that a ratio of M to N corresponds to the first preset BER means that when different first preset BERs need to be met, the test equipment may flexibly set the first preset BER by adjusting the ratio of M to N in the subsequence A. For example, when the ratio of M to N in the subsequence A is a first ratio, a corresponding first preset BER is a BER 3, and when the ratio of M to N in the subsequence A is a second ratio, a corresponding first preset BER is a BER 4. When the test equipment wants to set the first preset BER to the BER 3, the ratio of M to N in the subsequence A may be adjusted to the first ratio.

According to the method, in this disclosure, when the BER test is performed in the asymmetric transmission scenario, for example, in a scenario in which the BER test is performed on a transmission chip in a vehicle-mounted high-definition camera, the second device does not need an additional circuit to perform encoding to generate the first sequence, and may generate the first sequence based on one or more stored FEC units, so that a case in which an FEC code block is used for transmission in the asymmetric transmission scenario can be better adapted. In this disclosure, when the first preset BER needs to be adjusted, in one manner, the value of the quantity M of abnormal bits in the subsequence A may be adjusted, to flexibly construct a first sequence that matches the first preset BER and that is used to perform a function test. Alternatively, when a new first sequence needs to be set in this disclosure, the value of the quantity M of abnormal bits in the subsequence A may be adjusted, to obtain the new first sequence. In this disclosure, when the first preset BER needs to be adjusted, in another manner, the ratio of M to N in the subsequence A is adjusted, to flexibly construct a first sequence that matches the first preset BER and that is used to perform a function test. Alternatively, when a new first sequence needs to be set in this disclosure, the ratio of M to N in the subsequence A may be adjusted, to obtain the new first sequence.

In a possible design, the N bits are bits included in a valid sequence in the subsequence A, and the M bits are abnormal bits included in the valid sequence in the subsequence A, or the N bits are bits included in a valid sequence and a redundant sequence in the subsequence A, and the M bits are abnormal bits included in the valid sequence and the redundant sequence in the subsequence A. Each of the one or more FEC code blocks includes a data element sequence and a redundant element sequence, the valid sequence in the subsequence A includes the data element sequence of the one or more FEC code blocks, and the redundant sequence in the subsequence A includes the redundant element sequence of the one or more FEC code blocks.

It may be understood that bits included in the valid sequence in the subsequence A in this disclosure are bits included in data element sequences in all the FEC code blocks that constitute the subsequence A. Bits included in the redundant sequence in the subsequence A in this disclosure are bits included in redundant element sequences in all the FEC code blocks that constitute the subsequence A.

In an example, in the asymmetric transmission scenario in this disclosure, when counting the first BER based on the first sequence, the first device may count only data element sequences in FEC code blocks that constitute the first sequence. Therefore, when the first preset BER is designed, only the data element sequences in the FEC code blocks that constitute the first sequence may be considered. For example, in this case, the N bits corresponding to the first preset BER are bits included in the valid sequence in the subsequence A, and the M bits are abnormal bits included in the valid sequence in the subsequence A.

In another example, in the asymmetric transmission scenario in this disclosure, when counting the first BER based on the first sequence, the first device may alternatively consider all elements in FEC code blocks that constitute the first sequence, namely, data element sequences and redundant element sequences. Therefore, when the first preset BER is designed, all the elements in the FEC code blocks that constitute the first sequence may be considered. For example, in this case, the N bits corresponding to the first preset BER are bits included in the valid sequence and the redundant sequence in the subsequence A, and the M bits are abnormal bits included in the valid sequence and the redundant sequence in the subsequence A.

In a possible design, the subsequence A includes X first FEC code blocks and Y second FEC code blocks, all bits included in a data element sequence of the first FEC code block are normal bits, a data element sequence of the second FEC code block includes abnormal bits of a fixed quantity or abnormal bits of a fixed proportion, and Y or a ratio of Y to (X+Y) corresponds to the first preset BER, where X and Y are positive integers. Therefore, this disclosure provides another constitution manner of the subsequence A.

It may be understood that in this embodiment of this disclosure, that Y corresponds to the first preset BER means that when different first preset BERs need to be met, test equipment may flexibly set the first preset BER by adjusting a value of Y in the subsequence A. For example, when the value of Y in the subsequence A is Y1, a corresponding first preset BER is a BER 1, and when the value of Y in the subsequence A is Y2, a corresponding first preset BER is a BER 2. When the test equipment wants to set the first preset BER to the BER 1, the value of Y in the subsequence A may be adjusted to Y1.

In this embodiment of this disclosure, that a ratio of Y to (X+Y) corresponds to the first preset BER means that when different first preset BERs need to be met, the test equipment may flexibly set the first preset BER by adjusting the ratio of Y to (X+Y) in the subsequence A. For example, when the ratio of Y to (X+Y) in the subsequence A is a first ratio, a corresponding first preset BER is a BER 3, and when the ratio of Y to (X+Y) in the subsequence A is a second ratio, a corresponding first preset BER is a BER 4. When the test equipment wants to set the first preset BER to the BER 3, the ratio of Y to (X+Y) in the subsequence A may be adjusted to the first ratio.

According to the method, in this disclosure, when the BER test is performed in the asymmetric transmission scenario, for example, in a scenario in which the BER test is performed on a transmission chip in a vehicle-mounted high-definition camera, the second device does not need an additional circuit to perform encoding to generate the first sequence, and may generate the first sequence based on one or more stored FEC units, so that a case in which an FEC code block is used for transmission in the asymmetric transmission scenario can be better adapted. In this disclosure, when the first preset BER needs to be adjusted, in one manner, the value of Y in the subsequence A may be adjusted, to flexibly construct a first sequence that matches the first preset BER and that is used to perform a function test. Alternatively, when a new first sequence needs to be set in this disclosure, the value of Y in the subsequence A may be adjusted, to obtain the new first sequence. In this disclosure, when the first preset BER needs to be adjusted, in another manner, the ratio of Y to (X+Y) in the subsequence A is adjusted, to flexibly construct a first sequence that matches the first preset BER and that is used to perform a function test. Alternatively, when a new first sequence needs to be set in this disclosure, the ratio of Y to (X+Y) in the subsequence A may be adjusted, to obtain the new first sequence.

In a possible design, all bits included in the data element sequence of the second FEC code block are abnormal bits. Therefore, this disclosure provides another constitution manner of the subsequence A.

According to the method, in this disclosure, all bits included in the second FEC code block are set to abnormal bits, so that the first preset BER can be more conveniently adjusted, and a calculation process of determining the first preset BER when the BER test is performed in the asymmetric transmission scenario is simplified.

In a possible design, all bits included in a redundant element sequence of the first FEC code block are normal bits, and all bits included in a redundant element sequence of the second FEC code block are abnormal bits.

In an example, in the asymmetric transmission scenario in this disclosure, when counting the first BER based on the first sequence, the first device may count only valid sequences in the FEC code blocks that constitute the first sequence. Therefore, when the first preset BER is designed, only the data element sequences in the FEC code blocks that constitute the first sequence may be considered. For example, in this case, all the bits included in the data element sequence of the first FEC code block corresponding to the first preset BER are normal bits, and all the bits included in the data element sequence of the second FEC code block are abnormal bits.

In another example, in the asymmetric transmission scenario in this disclosure, when counting the first BER based on the first sequence, the first device may alternatively consider all elements in the FEC code blocks that constitute the first sequence, namely, the data element sequences and the redundant element sequences. Therefore, when the first preset BER is designed, all the elements in the FEC code blocks that constitute the first sequence may be considered. For example, in this case, all the bits included in the data element sequence and the redundant element sequence of the first FEC code block corresponding to the first preset BER are normal bits, and all the bits included in the data element sequence and the redundant element sequence of the second FEC code block are abnormal bits.

In a possible design, a length of the subsequence A is equal to a length of the subsequence B.

In a possible design, when a value of a normal bit is 0, 1 is a value of an abnormal bit, or when a value of a normal bit is 1, 0 is a value of an abnormal bit.

In an example, the normal bit in this embodiment of this disclosure may be understood as a bit that matches an expected value. For example, if a sequence sent by the test equipment to a device under test is 10111, expected bits received by the device under test need to be 10111. If a sequence received by the device under test is 11011, bits corresponding to a first position, a fourth position, and a fifth position of the sequence received by the device under test are consistent with expected values and are normal bits, and bits corresponding to a second position and a third position of the sequence received by the device under test are inconsistent with expected values and are abnormal bits.

According to the method, in this disclosure, the value of the normally received bit is set to 0, and the value of the abnormal bit is set to 1, or the value of the normally received bit is set to 1, and the value of the abnormal bit is set to 0. In this way, when performing the BER test based on the first sequence or the second sequence, the device under test may perform BER counting by recording a quantity of bits whose values are 1 or 0. A counting manner is more simplified, and helps determine the first BER more quickly and efficiently.

In a possible design, when the value of the normal bit is 0, all the bits included in the first FEC code block may be 0, and all the bits included in the second FEC code block may be 1, or when the value of the normal bit is 1, all the bits included in the first FEC code block may be 1, and all the bits included in the second FEC code block may be 0.

According to the method, in this disclosure, when the value of the normal bit is 0, all the bits included in the first FEC code block are set to 0, and all the bits included in the second FEC code block are set to 1. Alternatively, when the value of the normal bit is 1, all the bits included in the first FEC code block are set to 1, and all the bits included in the second FEC code block are set to 0. In this way, in the asymmetric transmission scenario, when performing the BER test based on the first sequence or the second sequence, the device under test may perform BER counting by recording a quantity of first FEC code blocks and/or a quantity of second FEC code blocks. A counting manner is more simplified, and helps determine the first BER more quickly and efficiently.

In a possible design, before the second device sends the first sequence to the first device, the second device performs link training with the first device.

According to the method, before an actual test is performed, link training is performed first, so that a receiving parameter of the second device (namely, the device under test) can be effectively converged, an actual test process is more stable, and an obtained test result is more accurate.

The communication method provided in this disclosure may be performed by a first device. The first device may be used as a device under test (Device Under Test, DUT). The first device may be abstracted as a computer system. The first device may be an entire system, or may be a part of components in an entire system, for example, a system chip or a processing chip. The system chip may also include a SOC or an SoC chip. Further, the first device may be an independent apparatus for performing a BER test, or the first device may be a component for performing a BER test in an entire system. For example, the first device may be a terminal apparatus or a vehicle-mounted device like a vehicle-mounted camera or a vehicle-mounted display that requires a BER test, or may be a system chip, a decision processing chip, or another type of chip that is configured to perform data transmission with a meta data controller (MDC) and that is in a camera or a display that requires a BER test.

According to a second aspect, an embodiment of this disclosure provides a communication method, including receiving a first sequence sent by a second device, where the first sequence includes P subsequences A, and the subsequence A is constituted by one or more FEC code blocks, counting a first BER of the received first sequence, receiving a second sequence sent by the second device, where the second sequence includes Q subsequences B, and the subsequence B is constituted by one or more FEC code blocks, and counting a second BER of the received second sequence, where a length of the second sequence is greater than or equal to a length of the first sequence, and P and Q are positive integers.

In an example, when a BER test is performed in an asymmetric transmission scenario, a first device may separately receive the first sequence and the second sequence. For example, the first device receives the first sequence first sent by the second device, and then receives the second sequence later sent by the second device.

In another example, when a BER test is performed in an asymmetric transmission scenario, a first device may receive the first sequence and the second sequence at the same time. For example, the first device may receive first information sent by the second device, where the first information includes the first sequence and the second sequence.

According to the method, in a BER test in this disclosure, an FEC code block used by a device for transmission is effectively used as a minimum repetition unit of the first sequence and the second sequence, so that complexity of constructing a test sequence by the device is reduced, and robustness of a test process is improved. Further, when the length of the second sequence is greater than the length of the first sequence, time of a function test based on the first sequence can be effectively shortened, and a test speed can be improved. In the asymmetric transmission scenario, this method can be used to perform a unidirectional BER test. This can simplify a test process and test time, and improve test efficiency. It may be understood that this test method may also be applied to a symmetric transmission scenario.

In a possible design, a quantity of abnormal bits in the received first sequence is counted, or a ratio of a quantity of abnormal bits in the received first sequence to a total quantity of bits in the received first sequence is counted.

According to the method, a manner of determining the first BER is provided. For example, the quantity of abnormal bits in the first sequence is recorded to determine the first BER. In addition, in this manner, when determining the first BER of the first sequence, the first device may directly count the abnormal bits without comparing the abnormal bits one by one, so that a speed at which the first device counts the first BER can be effectively increased.

In a possible design, a quantity of abnormal bits in the received second sequence is counted, or a ratio of a quantity of abnormal bits in the received second sequence to a total quantity of bits in the received second sequence is counted.

According to the method, a manner of determining the second BER is provided. For example, the quantity of abnormal bits in the second sequence is recorded to determine the second BER. In addition, in this manner, when determining the second BER of the second sequence, the first device may directly count the abnormal bits without comparing the abnormal bits one by one, so that a speed at which the first device counts the second BER can be effectively increased. In a possible design, when the first BER meets a first preset BER, the second BER of the received second sequence is counted.

In an example, the first preset BER may be a specific value. When the first preset BER is a specific value, and the first BER is equal to the first preset BER, it is determined that the first BER meets the first preset BER. Alternatively, when the first preset BER is a specific value, and the first BER is within a floating range that is based on the first preset BER, it is determined that the first BER meets the first preset BER. For example, a left boundary of the floating range based on the first preset BER may be obtained by subtracting a first value from the first preset BER, and a right boundary of the floating range based on the first preset BER may be obtained by adding a second value to the first preset BER. The first value and the second value may be equal or unequal, and both are positive numbers. For another example, a left boundary of the floating range based on the first preset BER may be obtained by multiplying the first preset BER by a first proportion, and a right boundary of the floating range based on the first preset BER may be obtained by multiplying the first preset BER by a second proportion. The second proportion is greater than the first proportion, and both are positive numbers.

In an example, the first preset BER may alternatively be a value range. When the first preset BER is a value range, and the first BER is within the value range of the first preset BER, it is determined that the first BER meets the first preset BER.

It may be understood that in the method, a case in which the first device is triggered to count the second BER of the second sequence in the asymmetric transmission scenario is provided. For example, when the first BER counted by the first device based on the first sequence meets the first preset BER, it is considered that the first device has an accurate error detection and counting capability, so that it can be better ensured that a result of a subsequent performance test performed by the first device is accurate and reliable. Therefore, the BER test performed on the first device based on the second sequence may be triggered.

In this disclosure, when it is determined whether the first BER counted by the first device based on the received first sequence meets the first preset BER, test personnel may manually determine whether the first BER counted by the first device based on the received first sequence meets the first preset BER. When determining that the first BER meets the first preset BER, the test personnel manually trigger the first device to count the second BER of the second sequence. Alternatively, in this disclosure, when it is determined whether the first BER counted by the first device based on the received first sequence meets the first preset BER, the first device may further transmit the first BER back to the second device, so that the second device determines whether the received first BER meets the first preset BER. If the first BER meets the first preset BER, the second device sends the second sequence to the first device, so that the first device is triggered to count the second BER of the second sequence after the second sequence is received.

In a possible design, the subsequence A includes N bits, the subsequence A includes M abnormal bits, and M or a ratio of M to N corresponds to the first preset BER, where N and M are positive integers, and N is greater than or equal to M. Therefore, this disclosure provides a constitution manner of the subsequence A.

It may be understood that in this embodiment of this disclosure, that M corresponds to the first preset BER means that when different first preset BERs need to be met, test equipment may flexibly set the first preset BER by adjusting a value of M in the subsequence A. For example, when the value of M in the subsequence A is M1, a corresponding first preset BER is a BER 1, and when the value of M in the subsequence A is M2, a corresponding first preset BER is a BER 2. When the test equipment wants to set the first preset BER to the BER 1, the value of M in the subsequence A may be adjusted to M1.

In this embodiment of this disclosure, that a ratio of M to N corresponds to the first preset BER means that when different first preset BERs need to be met, the test equipment may flexibly set the first preset BER by adjusting the ratio of M to N in the subsequence A. For example, when the ratio of M to N in the subsequence A is a first ratio, a corresponding first preset BER is a BER 3, and when the ratio of M to N in the subsequence A is a second ratio, a corresponding first preset BER is a BER 4. When the test equipment wants to set the first preset BER to the BER 3, the ratio of M to N in the subsequence A may be adjusted to the first ratio.

According to the method, in this disclosure, when the BER test is performed in the asymmetric transmission scenario, for example, when the first device is a transmission chip in a vehicle-mounted high-definition camera, and the second device performs the BER test on the transmission chip in the vehicle-mounted high-definition camera, the second device does not need an additional circuit to perform encoding to generate the first sequence, and may generate the first sequence based on one or more stored FEC units, so that a case in which an FEC code block is used for transmission in the asymmetric transmission scenario can be better adapted. In this disclosure, when the first preset BER needs to be adjusted, in one manner, the value of the quantity M of abnormal bits in the subsequence A may be adjusted, to flexibly construct a first sequence that matches the first preset BER and that is used to perform a function test. Alternatively, when a new first sequence needs to be set in this disclosure, the value of the quantity M of abnormal bits in the subsequence A may be adjusted, to obtain the new first sequence. In this disclosure, when the first preset BER needs to be adjusted, in another manner, the ratio of M to N in the subsequence A is adjusted, to flexibly construct a first sequence that matches the first preset BER and that is used to perform a function test. Alternatively, when a new first sequence needs to be set in this disclosure, the ratio of M to N in the subsequence A may be adjusted, to obtain the new first sequence.

In a possible design, the N bits are bits included in a valid sequence in the subsequence A, and the M bits are abnormal bits included in the valid sequence in the subsequence A, or the N bits are bits included in a valid sequence and a redundant sequence in the subsequence A, and the M bits are abnormal bits included in the valid sequence and the redundant sequence in the subsequence A. Each of the one or more FEC code blocks includes a data element sequence and a redundant element sequence, the valid sequence in the subsequence A includes the data element sequence of the one or more FEC code blocks, and the redundant sequence in the subsequence A includes the redundant element sequence of the one or more FEC code blocks.

It may be understood that bits included in the valid sequence in the subsequence A in this disclosure are bits included in data element sequences in all the FEC code blocks that constitute the subsequence A. Bits included in the redundant sequence in the subsequence A in this disclosure are bits included in redundant element sequences in all the FEC code blocks that constitute the subsequence A.

In an example, in the asymmetric transmission scenario in this disclosure, when counting the first BER based on the first sequence, the first device may count only data element sequences in FEC code blocks that constitute the first sequence. Therefore, when the first preset BER is designed, only the data element sequences in the FEC code blocks that constitute the first sequence may be considered. For example, in this case, the N bits corresponding to the first preset BER are bits included in the valid sequence in the subsequence A, and the M bits are abnormal bits included in the valid sequence in the subsequence A.

In another example, in the asymmetric transmission scenario in this disclosure, when counting the first BER based on the first sequence, the first device may alternatively consider all elements in the FEC code blocks that constitute the first sequence, namely, the data element sequences and the redundant element sequences. Therefore, when the first preset BER is designed, all the elements in the FEC code blocks that constitute the first sequence may be considered. For example, in this case, the N bits corresponding to the first preset BER are bits included in the valid sequence and the redundant sequence in the subsequence A, and the M bits are abnormal bits included in the valid sequence and the redundant sequence in the subsequence A.

In a possible design, the subsequence A includes X first FEC code blocks and Y second FEC code blocks, all bits included in a data element sequence of the first FEC code block are normal bits, a data element sequence of the second FEC code block includes abnormal bits of a fixed quantity or abnormal bits of a fixed proportion, and Y or a ratio of Y to (X+Y) corresponds to the first preset BER, where X and Y are positive integers. Therefore, this disclosure provides another constitution manner of the subsequence A.

It may be understood that in this embodiment of this disclosure, that Y corresponds to the first preset BER means that when different first preset BERs need to be met, test equipment may flexibly set the first preset BER by adjusting a value of Y in the subsequence A. For example, when the value of Y in the subsequence A is Y1, a corresponding first preset BER is a BER 1, and when the value of Y in the subsequence A is Y2, a corresponding first preset BER is a BER 2. When the test equipment wants to set the first preset BER to the BER 1, the value of Y in the subsequence A may be adjusted to Y1.

In this embodiment of this disclosure, that a ratio of Y to (X+Y) corresponds to the first preset BER means that when different first preset BERs need to be met, the test equipment may flexibly set the first preset BER by adjusting the ratio of Y to (X+Y) in the subsequence A. For example, when the ratio of Y to (X+Y) in the subsequence A is a first ratio, a corresponding first preset BER is a BER 3, and when the ratio of Y to (X+Y) in the subsequence A is a second ratio, a corresponding first preset BER is a BER 4. When the test equipment wants to set the first preset BER to the BER 3, the ratio of Y to (X+Y) in the subsequence A may be adjusted to the first ratio.

According to the method, in this disclosure, when the BER test is performed in the asymmetric transmission scenario, for example, in a scenario in which the BER test is performed on a transmission chip in a vehicle-mounted high-definition camera, the second device does not need an additional circuit to perform encoding to generate the first sequence, and may generate the first sequence based on one or more stored FEC units, so that a case in which an FEC code block is used for transmission in the asymmetric transmission scenario can be better adapted. In this disclosure, when the first preset BER needs to be adjusted, in one manner, the value of Y in the subsequence A may be adjusted, to flexibly construct a first sequence that matches the first preset BER and that is used to perform a function test. Alternatively, when a new first sequence needs to be set in this disclosure, the value of Y in the subsequence A may be adjusted, to obtain the new first sequence. In this disclosure, when the first preset BER needs to be adjusted, in another manner, the ratio of Y to (X+Y) in the subsequence A is adjusted, to flexibly construct a first sequence that matches the first preset BER and that is used to perform a function test. Alternatively, when a new first sequence needs to be set in this disclosure, the ratio of Y to (X+Y) in the subsequence A may be adjusted, to obtain the new first sequence.

In a possible design, all bits included in the data element sequence of the second FEC code block are abnormal bits. Therefore, this disclosure provides another constitution manner of the subsequence A.

According to the method, in this disclosure, all bits included in the second FEC code block are set to abnormal bits, so that the first preset BER can be more conveniently adjusted, and a calculation process of determining the first preset BER when the BER test is performed in the asymmetric transmission scenario is simplified.

In a possible design, all bits included in a redundant element sequence of the first FEC code block are normal bits, and all bits included in a redundant element sequence of the second FEC code block are abnormal bits.

In an example, in the asymmetric transmission scenario in this disclosure, when counting the first BER based on the first sequence, the first device may count only valid sequences in the FEC code blocks that constitute the first sequence. Therefore, when the first preset BER is designed, only the data element sequences in the FEC code blocks that constitute the first sequence may be considered. For example, in this case, all the bits included in the data element sequence of the first FEC code block corresponding to the first preset BER are normal bits, and all the bits included in the data element sequence of the second FEC code block are abnormal bits.

In another example, in the asymmetric transmission scenario in this disclosure, when counting the first BER based on the first sequence, the first device may alternatively consider all elements in the FEC code blocks that constitute the first sequence, namely, the data element sequences and the redundant element sequences. Therefore, when the first preset BER is designed, all the elements in the FEC code blocks that constitute the first sequence may be considered. For example, in this case, all the bits included in the data element sequence and the redundant element sequence of the first FEC code block corresponding to the first preset BER are normal bits, and all the bits included in the data element sequence and the redundant element sequence of the second FEC code block are abnormal bits.

In a possible design, a length of the subsequence A is equal to a length of the subsequence B.

In a possible design, when a value of a normal bit is 0, 1 is a value of an abnormal bit, or when a value of a normal bit is 1, 0 is a value of an abnormal bit.

In an example, the normal bit in this embodiment of this disclosure may be understood as a bit that matches an expected value. For example, if a sequence sent by the test equipment to a device under test is 10111, expected bits received by the device under test need to be 10111. If a sequence received by the device under test is 11011, bits corresponding to a first position, a fourth position, and a fifth position of the sequence received by the device under test are consistent with expected values and are normal bits, and bits corresponding to a second position and a third position of the sequence received by the device under test are inconsistent with expected values and are abnormal bits.

According to the method, in this disclosure, the value of the normally received bit is set to 0, and the value of the abnormal bit is set to 1, or the value of the normally received bit is set to 1, and the value of the abnormal bit is set to 0. In this way, when performing the BER test based on the first sequence or the second sequence in the asymmetric transmission scenario, the device under test may perform BER counting by recording a quantity of bits whose values are 1 or 0. A counting manner is more simplified, and helps determine the first BER more quickly and efficiently.

In a possible design, when the value of the normal bit is 0, all the bits included in the first FEC code block may be 0, and all the bits included in the second FEC code block may be 1, or when the value of the normal bit is 1, all the bits included in the first FEC code block may be 1, and all the bits included in the second FEC code block may be 0.

In a possible design, when the value of the normal bit is 0, all bits included in data element sequences of all FEC code blocks in the subsequence B are 0, or when the value of the normal bit is 1, all bits included in data element sequences of all FEC code blocks in the subsequence B are 1.

According to the method, in this disclosure, when the value of the normal bit is 0, all the bits included in the first FEC code block are set to 0, and all the bits included in the second FEC code block are set to 1. Alternatively, when the value of the normal bit is 1, all the bits included in the first FEC code block are set to 1, and all the bits included in the second FEC code block are set to 0. In this way, in the asymmetric transmission scenario, when performing the BER test based on the first sequence or the second sequence, the device under test may perform BER counting by recording a quantity of first FEC code blocks and/or a quantity of second FEC code blocks. A counting manner is more simplified, and helps determine the first BER more quickly and efficiently.

In a possible design, before the first device receives the first sequence sent by the second device, the first device further performs link training with the second device.

According to the method, before an actual test is performed, link training is performed first, so that a receiving parameter of the first device (namely, the device under test)

can be effectively converged, an actual test process is more stable, and an obtained test result is more accurate.

According to a third aspect, an embodiment of this disclosure provides a communication apparatus. The apparatus is configured to implement the first aspect or any method in the first aspect, and includes corresponding function modules or units, which are respectively configured to implement the steps in the method in the first aspect. A function may be implemented by hardware, or may be implemented by hardware executing corresponding software. The hardware or the software includes one or more modules or units corresponding to the function.

According to a fourth aspect, an embodiment of this disclosure provides a communication apparatus. The apparatus is configured to implement the second aspect or any method in the second aspect, and includes corresponding function modules or units, which are respectively configured to implement the steps in the method in the second aspect. A function may be implemented by hardware, or may be implemented by hardware executing corresponding software. The hardware or the software includes one or more modules or units corresponding to the function.

According to a fifth aspect, a communication apparatus is provided. The apparatus includes a processor and a memory. The memory is configured to store a computing program or instructions, and the processor is coupled to the memory. When the processor executes the computer program or the instructions, the apparatus is enabled to perform the first aspect or any method in the first aspect. The communication apparatus may be a second device, or an apparatus that can support a second device in implementing a function required in the method provided in the first aspect, for example, a chip system. For example, the communication apparatus may be a terminal device or a part of components (for example, a chip) in a terminal device. The terminal device may be, for example, an intelligent mobile terminal, a smart home device, an intelligent vehicle, or a smart wearable device. The intelligent mobile terminal is, for example, a mobile phone, a tablet computer, a notebook computer, an ultra-mobile personal computer (UMPC), a netbook, or a personal digital assistant (PDA). The smart home device is, for example, a smart refrigerator, a smart washing machine, a smart television, or a speaker. The smart vehicle wearable device is, for example, a smart headset, smart glasses, or smart clothes or shoes.

According to a sixth aspect, a communication apparatus is provided. The apparatus includes a processor and a memory. The memory is configured to store a computing program or instructions, and the processor is coupled to the memory. When the processor executes the computer program or the instructions, the apparatus is enabled to perform the second aspect or any method in the second aspect. The communication apparatus may be a first device, or an apparatus that can support a first device in implementing a function required in the method provided in the second aspect, for example, a chip system. For example, the communication apparatus may be a terminal device or a part of components (for example, a chip) in a terminal device. The terminal device may be, for example, an intelligent mobile terminal, a smart home device, an intelligent vehicle, or a smart wearable device. The intelligent mobile terminal is, for example, a mobile phone, a tablet computer, a notebook computer, an UMPC, a netbook, or a PDA. The smart home device is, for example, a smart refrigerator, a smart washing machine, a smart television, or a speaker. The smart vehicle wearable device is, for example, a smart headset, smart glasses, or smart clothes or shoes.

According to a seventh aspect, a terminal is provided. The terminal may include the apparatus according to any one of the third aspect to the sixth aspect. Optionally, the apparatus may be a smart home device, an intelligent manufacturing device, an intelligent transportation device, or the like, for example, a vehicle, an unmanned aerial vehicle, an unmanned transport vehicle, a car, or a robot.

According to an eighth aspect, this disclosure provides a chip. The chip is connected to a memory, and is configured to read and execute a computer program or instructions stored in the memory, to implement the method in any one of the first aspect or the possible implementations of the first aspect, or implement the method in any one of the second aspect or the possible implementations of the second aspect.

According to a ninth aspect, a computer-readable storage medium is provided. The computer-readable storage medium stores a computer program or instructions. When the computer program or the instructions are executed by a communication apparatus, the apparatus is enabled to perform the method in any one of the first aspect or the possible implementations of the first aspect, or the apparatus is enabled to perform the method in any one of the second aspect or the possible implementations of the second aspect.

According to a tenth aspect, this disclosure provides a computer program product. The computer program product includes a computer program or instructions. When the computer program or the instructions are executed by a communication apparatus, the apparatus is enabled to perform the method in any one of the first aspect or the possible implementations of the first aspect, or the apparatus is enabled to perform the method in any one of the second aspect or the possible implementations of the second aspect.

According to an eleventh aspect, this disclosure provides a communication system. The system includes a first device and a second device.

The second device is configured to send a first sequence to the first device, and send a second sequence to the first device.

The first device is configured to receive the first sequence sent by the second device, and count a first BER of the received first sequence, and is further configured to receive the second sequence sent by the second device, and count a second BER of the received second sequence.

The first sequence includes P subsequences A, and the subsequence A is constituted by one or more FEC code blocks. The second sequence includes Q subsequences B, and the subsequence B is constituted by one or more FEC code blocks. A length of the second sequence is greater than or equal to a length of the first sequence, and P and Q are positive integers.

It should be understood that, based on the technical solutions provided in this disclosure, a BER test in an asymmetric transmission scenario, a BER test applicable to a mass production chip, or a BER test applicable to a chip product can be more flexibly and efficiently implemented.

DESCRIPTION OF EMBODIMENTS

This disclosure provides a communication method, apparatus, and system, to improve flexibility of a BER test and effectively shorten test time. The communication method and the communication apparatus in embodiments of this disclosure are based on a same technical concept. Because the communication method and the communication apparatus in embodiments of this disclosure have similar principles for resolving problems. Therefore, for implementations of the communication apparatus and the communication method in embodiments of this disclosure, refer to each other. Details of repeated parts are not described.

The following further describes in detail embodiments of this disclosure with reference to accompanying drawings.

Figure 1A:
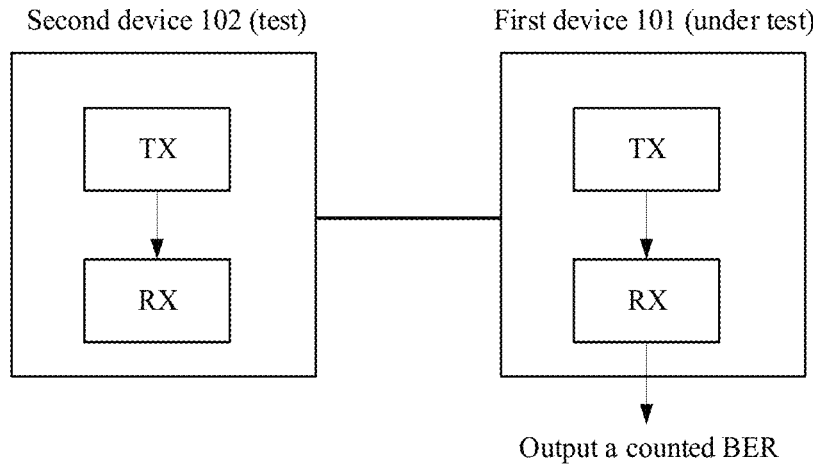
FIG. 1A, FIG. 1B, and FIG. 1C are example diagrams of a structure of a test system according to this disclosure.

The communication system in embodiments of this disclosure is first described. As shown in FIG. 1A, the communication system in embodiments of this disclosure may include a first device 101 and a second device 102. The communication system in embodiments of this disclosure may be applied to an asymmetric transmission scenario, and may also be applied to a symmetric transmission scenario. In addition, the communication system in embodiments of this disclosure may be applied to a wired transmission scenario and a wireless transmission scenario.

The first device 101 in embodiments of this disclosure may be an electronic device having sending and receiving functions or a component in the electronic device. For example, the first device 101 may be an electronic device including a transmitter (TX) and a receiver (RX).

The second device 102 in embodiments of this disclosure may be an electronic device having sending and receiving functions or a component in the electronic device. For example, the second device 102 may be an electronic device including a TX and an RX.

Figure 1B:
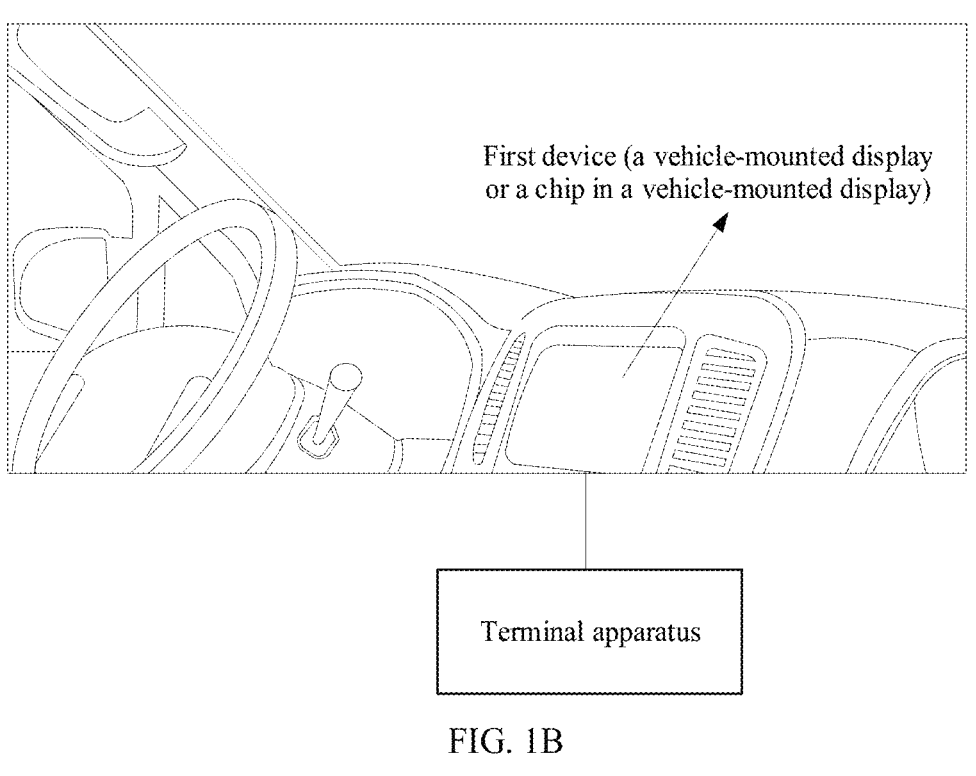
Figure 1C:
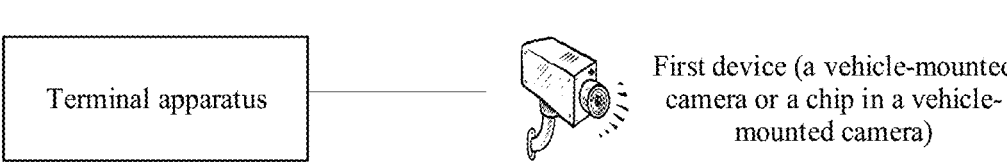

For example, as shown in FIG. 1B, the first device may be a vehicle-mounted display on which a BER test needs to be performed or a chip that is in a vehicle-mounted display and on which a BER test needs to be performed, and the second device may be an external terminal apparatus configured to perform a BER test on the first device. As shown in FIG. 1C, the first device may alternatively be a vehicle-mounted camera on which a BER test needs to be performed or a chip that is in a vehicle-mounted camera and on which a BER test needs to be performed, and the second device may be an external terminal apparatus configured to perform a BER test on the first device.

Optionally, the first device 101 and the second device 102 in embodiments of this disclosure may be connected through a cable.

In embodiments of this disclosure, when the communication method is performed based on the communication system, the second device mainly sends a first sequence and a second sequence to the first device, and then determines, based on a first BER that is output by the first device based on the first sequence and a second BER that is output based on the second sequence, whether the first device passes the test.

The first device 101 shown in FIGS. 1A-1C may be understood as a device that needs to be tested, namely, a device under test, and has a BER counting function. The second device 102 shown in FIGS. 1A-1C may be understood as a device that tests a device under test, namely, a test device, and has a sequence sending function.

In addition, the test device in embodiments of this disclosure may further have a sequence generation function, a sequence adjustment function, or the like.

Optionally, the first device 101 may further have a display function. For example, the first device 101 may include a display configured to display BERs obtained when BER tests are performed based on different sequences. Alternatively, the first device 101 may further have a voice broadcast function. For example, the first device 101 may include a voice broadcast apparatus configured to broadcast BERs obtained when tests are performed based on different sequences.

Optionally, a quantity of cables connected between the first device 101 and the second device 102 is not limited in embodiments of this disclosure.

Figure 2A:
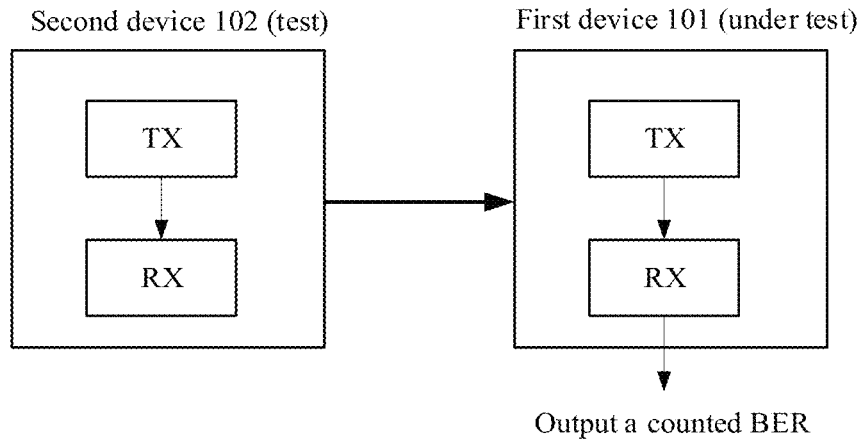
FIG. 2A, FIG. 2B, and FIG. 2C are example diagrams of a connection between a test device and a device under test according to this disclosure.
Figure 2B:
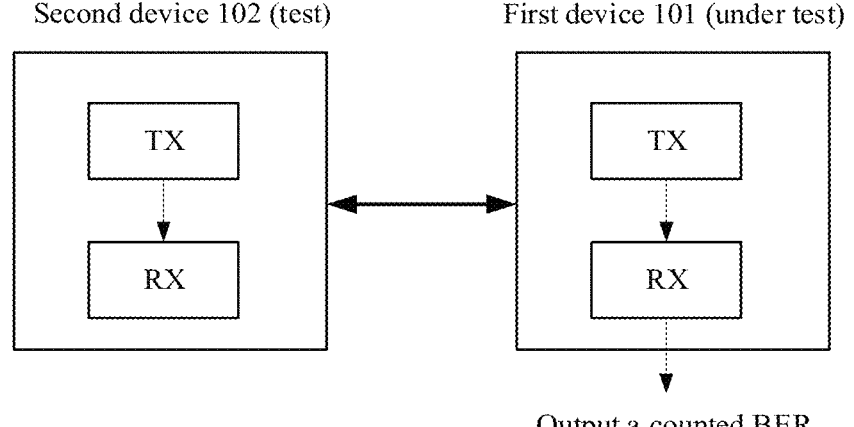

In an example, as shown in FIG. 2A, the first device and the second device are connected through one cable, and the cable connected between the first device and the second device is used by the second device to perform unidirectional communication with the first device, or as shown in FIG. 2B, one cable connected between the first device and the second device is used for bidirectional communication between the second device and the first device.

Figure 2C:
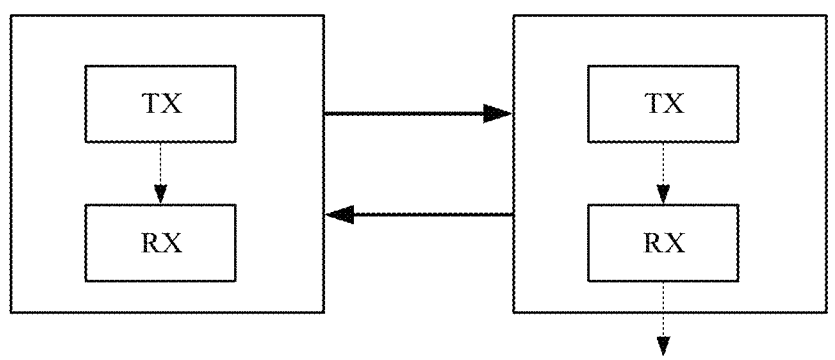

In an example, as shown in FIG. 2C, the first device and the second device are connected through two cables. A cable 1 connected between the first device and the second device is used by the second device to perform unidirectional communication with the first device, and a cable 2 connected between the first device and the second device is used by the first device to perform unidirectional communication with the second device.

Figures 3, 4:
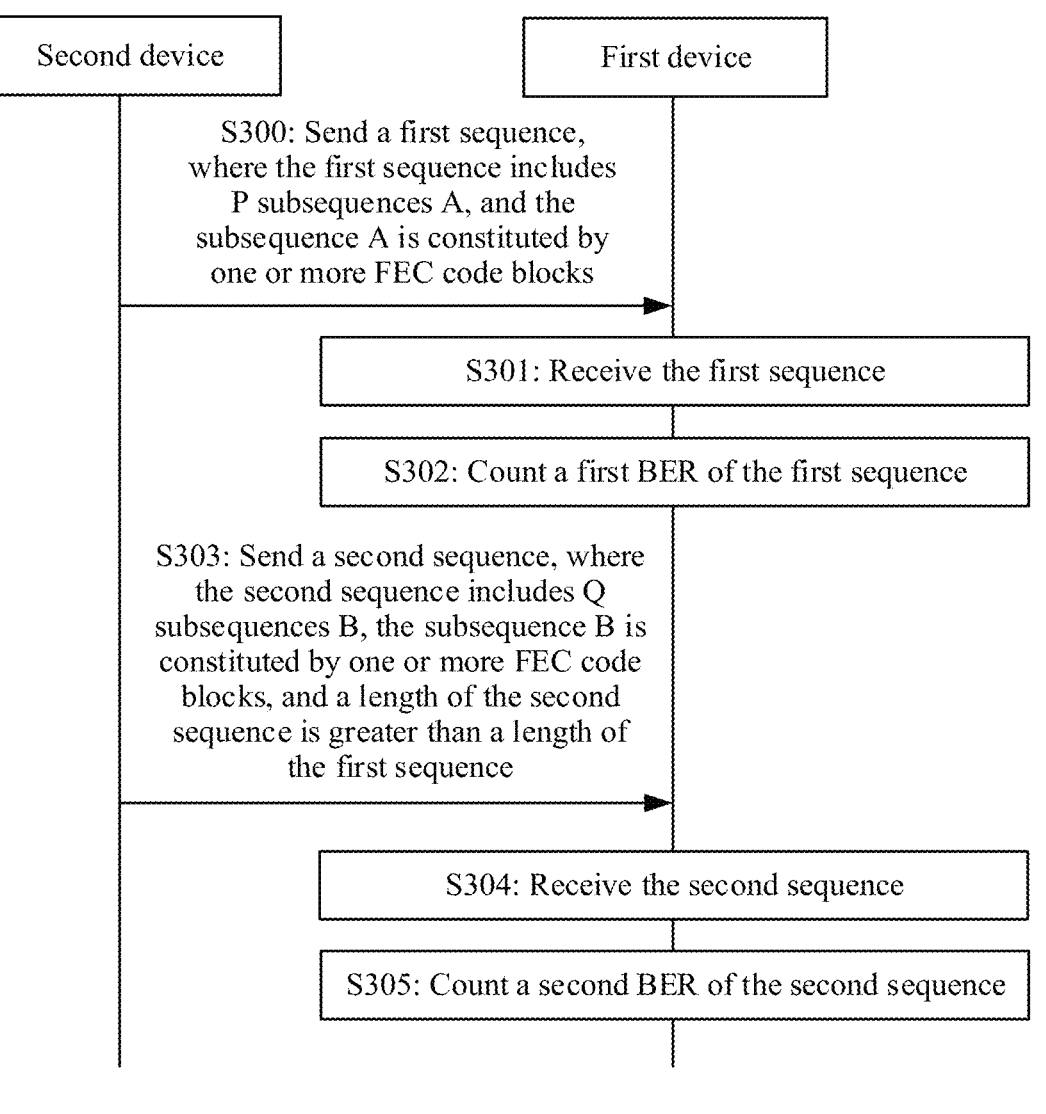
FIG. 3 is a schematic flowchart of a first communication method according to this disclosure.
FIG. 4 is a schematic diagram of an FEC code block according to this disclosure.

Further, to better understand the communication method in this disclosure, FIG. 3 is an example flowchart of the communication method according to this disclosure. It should be understood that processes shown in FIG. 3 may be performed in various sequences and/or simultaneously. This is not limited to an execution sequence shown in FIG. 3.

S300: A second device sends a first sequence to a first device.

In this embodiment of this disclosure, the first sequence is used by the first device to count a first BER.

In this embodiment of this disclosure, the first sequence sent by the second device to the first device may be understood as a function test sequence. The function test sequence is used to perform a function test on the first device, and is usually sent before a performance test is performed on the first device. In addition, a small amount of data is sent in the function test sequence, and the data is mainly used to determine whether the first device has an accurate error detection and counting capability, so that it can be better ensured that a result of the performance test performed on the first device is accurate and reliable, and test time for the first device is reduced.

Further, in this embodiment of this disclosure, the first sequence includes P subsequences A, the subsequence A is constituted by one or more FEC code blocks, and P is a positive integer.

For example, the first sequence may be represented as {A, A, . . . , A}, and P is a quantity of repetitions of A in the first sequence. In this embodiment of this disclosure, a type of the FEC code block that constitutes the subsequence A and a specific structure of each type of FEC code block are not limited. Any FEC code block applicable to this embodiment of this disclosure falls within the protection scope of embodiments of this disclosure.

In an example, FIG. 4 is a schematic diagram of an FEC code block according to an embodiment of this disclosure. The FEC code block may include two parts. A first part is a data element sequence, namely, a sequence including at least one data element. A second part is a redundant element sequence, namely, a sequence including at least one redundant element. Each element is constituted by bit sequences of a same length.

Reed-Solomon (RS)-FEC (384, 354, 9) is used as an example. RS-FEC (384, 354, 9) indicates that a total quantity of elements is 384, a quantity of data elements is 354, a length of each element is 9 bits, a length of an entire RS-FEC code block is 384×9=3456 bits, and a quantity of redundant elements generated based on the data elements through RS encoding is 30 (384-354=30).

In a case, when the subsequence A is constituted by one FEC code block, the subsequence A may be represented as: A=[data element sequence, redundant element sequence], the data element sequence constitutes a valid sequence in the subsequence A, and the redundant element sequence constitutes a redundant sequence in the subsequence A.

In another case, when the subsequence A is constituted by a plurality of FEC code blocks, for example, the subsequence A is constituted by L (a positive integer greater than 1) FEC code blocks, the subsequence A may be represented as: A=[(data element sequence 1, redundant element sequence 1), (data element sequence 2, redundant element sequence 2), . . . , (data element sequence L, redundant element sequence L)]. Herein, (data element sequence i, redundant element sequence i) constitutes one RS-FEC code block, a valid sequence in the subsequence A includes the data element sequence i, a redundant sequence in the subsequence A includes the redundant element sequence i, i is an integer, and i=1, . . . , or L.

S301: The first device receives the first sequence sent by the second device.

In this embodiment of this disclosure, the first device may obtain, through a cable that is connected between the first device and the second device and that is used for communication, the first sequence sent by the test equipment.

S302: The first device counts the first BER of the received first sequence.

This disclosure provides a verification solution, and specific content may be as follows.

First, the first sequence (or the function test sequence) used to perform the function test and a first preset BER corresponding to the first sequence are determined.

It should be noted that, in this embodiment of this disclosure, the first sequence used to perform the function test may be first designed, so that the first preset BER is determined based on the first sequence. In this embodiment of this disclosure, a value of the first preset BER may alternatively be first determined, so that the first sequence is designed based on the first preset BER.

Then, the second device sends the first sequence to the first device, so that the first device counts a BER of the received first sequence, to obtain the first BER.

Finally, it may be determined, based on the first BER and the first preset BER, whether the performance test can be effectively performed on the first device. If the first BER obtained by the first device based on the received first sequence meets the first preset BER, it may be considered that the performance test can be effectively performed on the first device. Otherwise, it is considered that the performance test cannot be effectively performed on the first device.

In addition, in this embodiment of this disclosure, to better ensure that the performance test can be effectively performed on the first device, the second device may send the first sequence to the first device a plurality of times to perform the function test. When the function test is performed on the first device a plurality of times, and a proportion (namely, a pass rate) of a quantity of times of passing the function test to a total quantity of times of performing the function test meets a first threshold proportion, it may be considered that the performance test can be effectively performed on the first device. Otherwise, it is considered that the performance test cannot be effectively performed on the first device.

The first preset BER in this embodiment of this disclosure may be a specific value, or may be a value range.

Optionally, when the first preset BER is a specific value, and the first BER is equal to the first preset BER, it is determined that the first BER meets the first preset BER.

Optionally, when the first preset BER is a specific value, and the first BER is within a floating range that is based on the first preset BER, it is determined that the first BER meets the first preset BER.

In a case, a left boundary of the floating range based on the first preset BER may be obtained by subtracting a first value from the first preset BER, and a right boundary of the floating range based on the first preset BER may be obtained by adding a second value to the first preset BER. The first value and the second value may be equal or unequal, and both are positive numbers.

For example, it is assumed that both the first value and the second value are 0.05, and the first preset BER is 10.2%. In this case, a range obtained based on the first preset BER is 5.2% to 15.2%.

In another case, a left boundary of the floating range based on the first preset BER may be obtained by multiplying the first preset BER by a first proportion, and a right boundary of the floating range based on the first preset BER may be obtained by multiplying the first preset BER by a second proportion. The second proportion is greater than the first proportion, and both are positive numbers.

For example, it is assumed that the first proportion is 0.95, the second proportion is 1.05, and the first preset BER is 10.2%. In this case, a range obtained based on the first preset BER is 9.69% to 10.71%.

Optional, when the first preset BER is a value range, and the first BER is within the value range of the first preset BER, it is determined that the first BER meets the first preset BER.

S303: The second device sends a second sequence to the first device.

In this embodiment of this disclosure, the second sequence is used by the first device to count a second BER.

In this embodiment of this disclosure, the second sequence sent by the second device to the first device may be understood as a performance test sequence. The performance test sequence is used to perform the performance test on the first device, and is generally sent after the first device passes the function test. In addition, a large amount of data is sent in the performance test sequence, and the data is mainly used to determine whether performance of the first device is qualified.

For example, it is assumed that the first device is a chip. The second device sends a performance test sequence to the chip, to determine, based on a BER result obtained by the chip through counting based on the received performance test sequence, whether the chip is a qualified chip.

Further, in this embodiment of this disclosure, the second sequence includes Q subsequences B, the subsequence B is constituted by one or more FEC code blocks, and Q is a positive integer.

For example, the second sequence may be represented as {B, B, . . . , B}, and Q is a quantity of repetitions of B in the second sequence. In this embodiment of this disclosure, a type of the FEC code block that constitutes the subsequence B and a specific structure of each type of FEC code block are not limited. Any FEC code block applicable to this embodiment of this disclosure falls within the protection scope of embodiments of this disclosure.

In this embodiment of this disclosure, a length of the second sequence is greater than or equal to a length of the first sequence.

The following separately provides descriptions based on different cases of the length of the second sequence and the length of the first sequence.

Case 1: The length of the second sequence is equal to the length of the first sequence.

In an example, when the length of the second sequence in this embodiment of this disclosure is equal to the length of the first sequence, a length of the subsequence B in the second sequence may be equal to a length of the subsequence A in the first sequence, and a quantity of subsequences B in the second sequence may be equal to a quantity of subsequences A in the first sequence. In this way, the length of the second sequence is equal to the length of the first sequence.

For example, the length of the subsequence B is 50 bits, the length of the subsequence A is 50 bits, the quantity of subsequences B in the second sequence is 20, and the quantity of subsequences A in the first sequence is also 20. In this case, the length of the second sequence is equal to the length of the first sequence, and is 50×20=1000 bits.

In an example, when the length of the second sequence in this embodiment of this disclosure is equal to the length of the first sequence, a length of the subsequence B in the second sequence may be less than a length of the subsequence A in the first sequence, and a quantity of subsequences B in the second sequence may be greater than a quantity of subsequences A in the first sequence. In this way, the length of the second sequence is equal to the length of the first sequence.

For example, the length of the subsequence B is 40 bits, the length of the subsequence A is 50 bits, the quantity of subsequences B in the second sequence is 20, and the quantity of subsequences A in the first sequence is 16. In this case, the length of the second sequence is 800 bits (20× 40=800), and is equal to the length of the first sequence 800 bits (50×16=800).

Case 2: The length of the second sequence is greater than the length of the first sequence.

In an example, when the length of the second sequence in this embodiment of this disclosure is greater than the length of the first sequence, a length of the subsequence B in the second sequence may be equal to a length of the subsequence A in the first sequence, and a quantity of subsequences B in the second sequence may be greater than a quantity of subsequences A in the first sequence. In this way, the length of the second sequence is greater than the length of the first sequence.

For example, the length of the subsequence B is 50 bits, the length of the subsequence A is 50 bits, the quantity of subsequences B in the second sequence is 30, and the quantity of subsequences A in the first sequence is 20. In this case, the length of the second sequence is 1500 bits (30× 50=1500), and is greater than the length of the first sequence 1000 bits (50×20=1000).

In an example, when the length of the second sequence in this embodiment of this disclosure is greater than the length of the first sequence, a length of the subsequence B in the second sequence may be greater than a length of the subsequence A in the first sequence, and a quantity of subsequences B in the second sequence may be equal to a quantity of subsequences A in the first sequence. In this way, the length of the second sequence is greater than the length of the first sequence.

For example, the length of the subsequence B is 50 bits, the length of the subsequence A is 40 bits, the quantity of subsequences B in the second sequence is 30, and the quantity of subsequences A in the first sequence is also 30. In this case, the length of the second sequence is 1500 bits (30×50=1500), and is greater than the length of the first sequence 1200 bits (40×30=1200).

In an example, when the length of the second sequence in this embodiment of this disclosure is greater than the length of the first sequence, a length of the subsequence B in the second sequence may be greater than a length of the subsequence A in the first sequence, and a quantity of subsequences B in the second sequence may be greater than a quantity of subsequences A in the first sequence. In this way, the length of the second sequence is greater than the length of the first sequence.

For example, the length of the subsequence B is 50 bits, the length of the subsequence A is 40 bits, the quantity of subsequences B in the second sequence is 30, and the quantity of subsequences A in the first sequence is 20. In this case, the length of the second sequence is 1500 bits (30× 50=1500), and is greater than the length of the first sequence 800 bits (40×20=800).

In addition, in this embodiment of this disclosure, the second device may send the first sequence and the second sequence to the first device together. In other words, in this embodiment of this disclosure, S303 and S300 may be combined into one step.

For example, in S300, the second device may send first information to the first device, where the first information may include the first sequence and the second sequence.

S304: The first device receives the second sequence sent by the second device.

S305: The first device counts the second BER of the received second sequence.

This disclosure provides a verification solution, and specific content may be as follows.

First, the second sequence (or the performance test sequence) used to perform the performance test and a second preset BER corresponding to the second sequence are determined.

It should be noted that, in this embodiment of this disclosure, the second sequence used to perform the performance test may be first designed, so that the second preset BER is determined based on the second sequence. In this embodiment of this disclosure, a value of the second preset BER may alternatively be first determined, so that the second sequence is designed based on the second preset BER.

Then, the second device sends the second sequence to the first device, so that the first device counts a BER of the received second sequence, to obtain the second BER.

Finally, it may be determined, based on the second BER and the second preset BER, whether the first device passes the performance test. If the second BER obtained by the first device based on the received second sequence meets the second preset BER, it may be considered that the first device passes the performance test. Otherwise, it is considered that the first device does not pass the performance test.

In addition, in this embodiment of this disclosure, to better ensure accuracy of a result of the performance test performed on the first device, the second device may send the second sequence to the first device a plurality of times to perform the performance test. When the performance test is performed on the first device a plurality of times, and a proportion (namely, a pass rate) of a quantity of times of passing the performance test to a total quantity of performance tests meets a second threshold proportion, it may be considered that the first device is qualified. Otherwise, it is considered that the first device is unqualified.

The second preset BER threshold in this embodiment of this disclosure may be a specific value, or may be a value range.

Optionally, when the second preset BER is a specific value, and the second BER is equal to the second preset BER, it is determined that the second BER meets the second preset BER.

For example, when the second preset BER is $10^{-12}$, if the second BER is less than $10^{-12}$, it is determined that the second BER meets the second preset BER.

Optional, when the second preset BER is a value range, and the second BER is within the value range of the second preset BER, it is determined that the second BER meets the second preset BER.

According to the foregoing method, because the first sequence and the second sequence that are used to perform a BER test in an asymmetric transmission scenario in this disclosure each are constituted by at least one FEC code block, a design manner in which an FEC code block sequence is used as a minimum repetition unit of the first sequence and the second sequence can better adapt to a case in which the FEC code block is used for transmission in the asymmetric transmission scenario, and better facilitate BER counting performed by the first device and/or the second device. In addition, the first sequence in this disclosure is constituted by P subsequences A, and the second sequence is constituted by Q subsequences B. It can be learned that there is no coupling relationship between the first sequence and the second sequence in this disclosure, so that a sequence for performing the BER test in the asymmetric transmission scenario is more flexible. In addition, currently, the function test sequence is usually obtained by changing a value of a preset bit in the performance test sequence, and the length of the second sequence in this disclosure is greater than or equal to the length of the first sequence. Therefore, when the length of the second sequence is greater than the length of the first sequence, time of the function test based on the first sequence can be effectively shortened, and a test speed can be improved.

Further, in this embodiment of this disclosure, a value of a normally received bit may be set to 0, and a value of an abnormal bit may be set to 1, or a value of a normally received bit may be set to 1, and a value of an abnormal bit may be set to 0, so that during the BER test, a quantity of bits whose values are 1 or 0 may be recorded for counting. For example, all bits in the second sequence are set to 0, a value of an abnormal bit in the first sequence is set to 1, and a value of a normal bit in the first sequence is 0.

According to this design manner, when performing the BER test based on the first sequence or the second sequence, a device under test may perform BER counting by recording a quantity of special values 1 or 0 corresponding to abnormal bits. A counting manner is more simplified, and helps determine a BER more quickly and efficiently.

Further, in this embodiment of this disclosure, there are a plurality of manners of constructing the first sequence, including but not limited to the following manners.

Figures 5A, 5B, 5C:
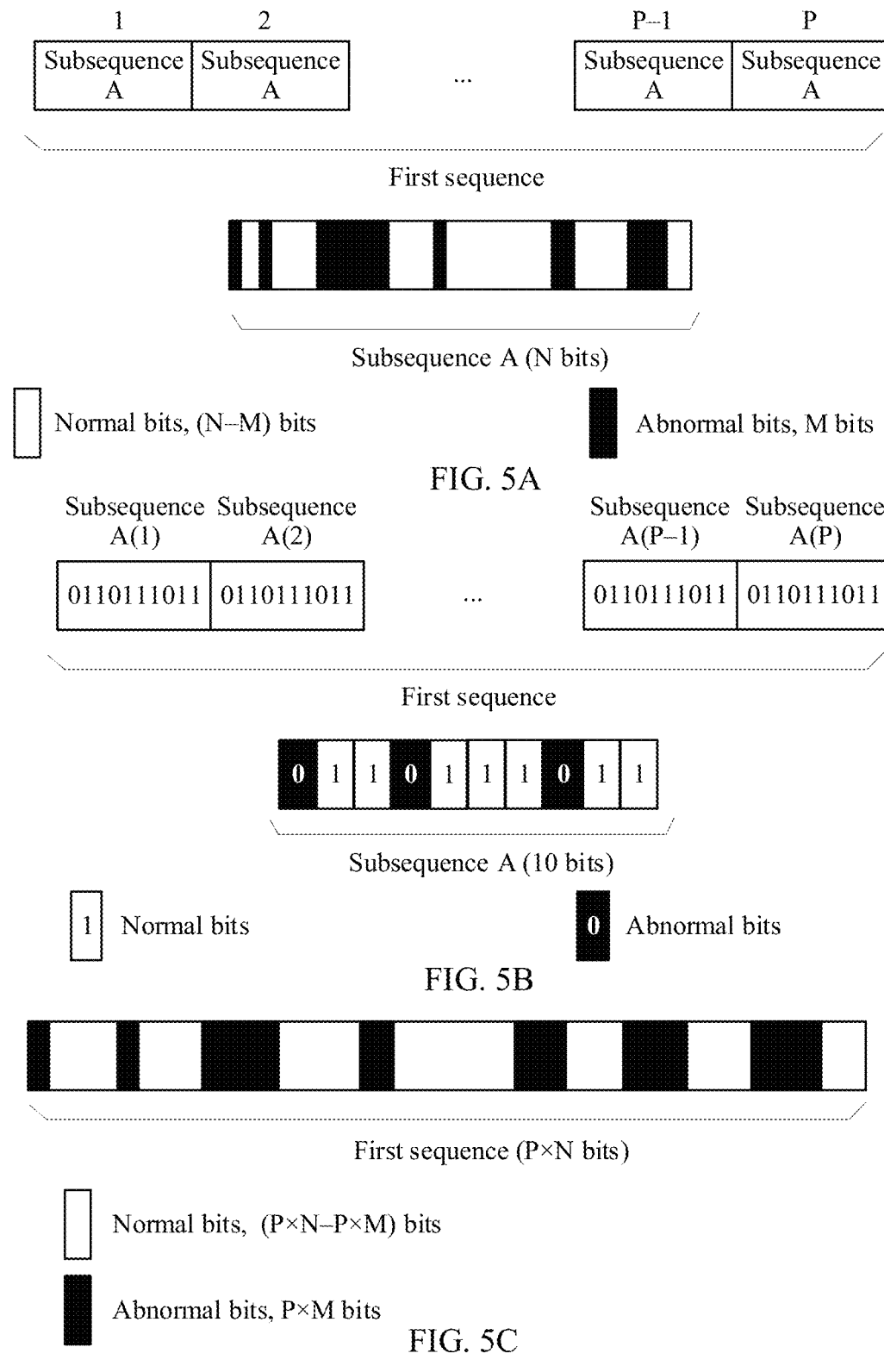
FIG. 5A, FIG. 5B, and FIG. 5C are example diagrams of a structure of a 1$^{st}$ first sequence according to this disclosure.

Construction manner 1: As shown in FIG. 5A, the first sequence includes P subsequences A, each subsequence A includes N bits, and the N bits include M abnormal bits. P is a positive integer, and represents a quantity of subsequences A in the first sequence.

In addition, positions of the subsequences A in the first sequence may be further represented by using 1 to P. For example, a subsequence A corresponding to 1 shown in FIG. 5A may represent a subsequence A at a first position in the first sequence, a subsequence A corresponding to 2 shown in FIG. 5A may represent a subsequence A at a second position in the first sequence, and a subsequence A corresponding to (P-1) shown in FIG. 5A may represent a subsequence A at a $(P-1)^{th}$ position in the first sequence, a subsequence A corresponding to P shown in FIG. 5A may represent a subsequence A at a $P^{th}$ position in the first sequence. N is a positive integer and represents a total quantity of bits included in one subsequence A. M is a positive integer and represents a quantity of abnormal bits included in one subsequence A. It may be understood that N is greater than or equal to M in this embodiment of this disclosure.

For example, it is assumed that P is 5, N is 7, and M is 2. In this case, the first sequence in FIG. 5A may include five subsequences A, a total quantity of bits included in each subsequence A is 7, and there are two abnormal bits in the seven bits included in each subsequence A.

For another example, it is assumed that the subsequence A is 0110111011, where 0 represents an abnormal bit, and 1 represents a normal bit. In this case, a total quantity of bits included in the subsequence A is 10 bits, that is, N=10, and a quantity of abnormal bits included in the subsequence A is 3 bits, that is, M=3. Based on this, the first sequence may alternatively be represented as a sequence shown in FIG. 5B. A subsequence A (1) shown in FIG. 5B may represent a subsequence A at a first position in the first sequence, a subsequence A (2) shown in FIG. 5B may represent a subsequence A at a second position in the first sequence, a subsequence A (P-1) shown in FIG. 5B may represent a subsequence A at a $(P-1)^{th}$ position in the first sequence, and a subsequence A (P) shown in FIG. 5B may represent a subsequence A at a $P^{th}$ position in the first sequence.

In addition, because the first sequence includes P subsequences A, the total quantity of bits of each subsequence A is N, and the quantity of abnormal bits is M, it may be understood that a total quantity of bits included in the first sequence is a sum of total quantities of bits included in all the subsequences A in the first sequence, that is, P×N, a quantity of abnormal bits included in the first sequence is a sum of quantities of abnormal bits included in all the subsequences A in the first sequence, that is, P×M, and a quantity of normal bits included in the first sequence is a sum of quantities of normal bits included in all the subsequences A in the first sequence, that is, (P×N−P×M). Therefore, the first sequence may be further simplified as a sequence shown in FIG. 5C. The first sequence includes P×N bits, and there are P×M abnormal bits in the P×N bits.

Based on the construction manner 1, in this embodiment of this disclosure, the quantity of abnormal bits in the first sequence may be further adjusted to correspond to different first preset BERs.

Optionally, in this embodiment of this disclosure, M or a ratio of M to N in the first sequence may be adjusted to correspond to different first preset BERs. For example, when a value of M in the subsequence A is M1, a corresponding first preset BER is a BER 1, and when a value of M in the subsequence A is M2, a corresponding first preset BER is a BER 2. When test equipment wants to set the first preset BER to the BER 1, the value of M in the subsequence A may be adjusted to M1.

For another example, when the ratio of M to N in the subsequence A is a first ratio, a corresponding first preset BER is a BER 3, and when the ratio of M to N in the subsequence A is a second ratio, a corresponding first preset BER is a BER 4. When test equipment wants to set the first preset BER to the BER 3, the ratio of M to N in the subsequence A may be adjusted to the first ratio.

Optionally, in this embodiment of this disclosure, the first preset BER corresponding to the first sequence may be determined according to the following formula 1:

$$\text{First preset } BER = P \times M / P \times N = M / N \qquad \text{Formula 1}$$

P represents a quantity of subsequences A included in the first sequence, N represents a total quantity of bits included in one subsequence A, and M represents a quantity of abnormal bits included in one subsequence A.

In a case, the N bits in this embodiment of this disclosure may be bits included in a valid sequence in the subsequence A, and the M bits in this embodiment of this disclosure may be abnormal bits included in the valid sequence in the subsequence A.

For example, it is assumed that the subsequence A in the first sequence is a bit sequence constituted by an RS-FEC (384, 354, 9) code block, where "9" in the RS-FEC (384, 354, 9) indicates that a length of each element in the RS-FEC code block is 9 bits, "354" in the RS-FEC (384, 354, 9) indicates that a quantity of data elements included in the RS-FEC code block is 354, and "384" in RS-FEC (384, 354, 9) indicates that a total quantity of elements included in the RS-FEC code block is 384. Because the total quantity of elements in the RS-FEC code block is a sum of the quantity of data elements and a quantity of redundant elements, it may be obtained, based on the total quantity 384 of elements and the quantity 354 of data elements, that the quantity of redundant elements is 30. Because the length of each element is 9 bits, a length of the entire RS-FEC code block is 384×9=3456 bits, a total length of a redundant element sequence is 30×9=270 bits, and a total length of a data element sequence is 354×9=3186 bits. In this case, a value of N is 3186, which is a quantity of bits included in the valid sequence in the subsequence A.

When the quantity of abnormal bits in the subsequence A is set to 118, that is, the value of M is 118, the value of M that is 118 and the value of N that is 3186 are substituted into the formula 1, and it may be obtained that the first preset BER corresponding to the first sequence is 3.7% (M/N=118/3186=3.7%).

When the quantity of abnormal bits in the subsequence A is set to 236, that is, the value of M is 236, the value of M that is 236 and the value of N that is 3186 are substituted into the formula 1, and it may be obtained that the first preset BER corresponding to the first sequence is 7.4% (M/N=236/3186=7.4%).

When the quantity of abnormal bits in the subsequence A is set to 354, that is, the value of M is 354, the value of M that is 354 and the value of N that is 3186 are substituted into the formula 1, and it may be obtained that the first preset BER corresponding to the first sequence is 11.1% (M/N=354/3186=11.1%).

In another case, the N bits in this embodiment of this disclosure may be bits included in a valid sequence and a redundant sequence in the subsequence A, and the M bits in this embodiment of this disclosure may be abnormal bits included in the valid sequence and the redundant sequence in the subsequence A.

For example, it is assumed that the subsequence A in the first sequence is also a bit sequence constituted by one RS-FEC (384, 354, 9) code block. Because a length of the entire RS-FEC code block is 384×9=3456 bits, a total length of a redundant element sequence is 30×9=270 bits, and a total length of a data element sequence is 354×9=3186 bits. In this case, a value of N is 3456, which is a quantity of bits included in the valid sequence and the redundant sequence in the subsequence A.

When the quantity of abnormal bits in the subsequence A is set to 118, that is, the value of M is 118, the value of M that is 118 and the value of N that is 3456 are substituted into the formula 1, and it may be obtained that the first preset BER corresponding to the first sequence is 3.4% (M/N=118/3456=3.4%).

When the quantity of abnormal bits in the subsequence A is set to 236, that is, the value of M is 236, the value of M that is 236 and the value of N that is 3456 are substituted into the formula 1, and it may be obtained that the first preset BER corresponding to the first sequence is 6.8% (M/N=236/3456=6.8%).

When the quantity of abnormal bits in the subsequence A is set to 354, that is, the value of M is 354, the value of M that is 354 and the value of N that is 3456 are substituted into the formula 1, and it may be obtained that the first preset BER corresponding to the first sequence is 10.2% (M/N=354/3456=10.2%).

According to the construction manner 1, in this embodiment of this disclosure, when the corresponding first preset BER is determined based on M or the ratio of M to N, only a data element sequence part in the FEC code block that constitutes the sequence may be considered, or all bits in the FEC code block that constitutes the sequence, namely, a data element sequence and a redundant element sequence, may be considered.

According to the construction manner 1, in this disclosure, when the first preset BER needs to be adjusted, in one manner, the value of the quantity M of abnormal bits in the subsequence A may be adjusted, to flexibly construct a first sequence that matches the first preset BER and that is used to perform the function test. Alternatively, when a new first sequence needs to be set in this disclosure, the value of the quantity M of abnormal bits in the subsequence A may be adjusted, to obtain the new first sequence. In this disclosure, when the first preset BER needs to be adjusted, in another manner, the ratio of M to N in the subsequence A is adjusted, to flexibly construct a first sequence that matches the first preset BER and that is used to perform the function test. Alternatively, when a new first sequence needs to be set in this disclosure, the ratio of M to N in the subsequence A may be adjusted, to obtain the new first sequence.

Figures 6, 7:
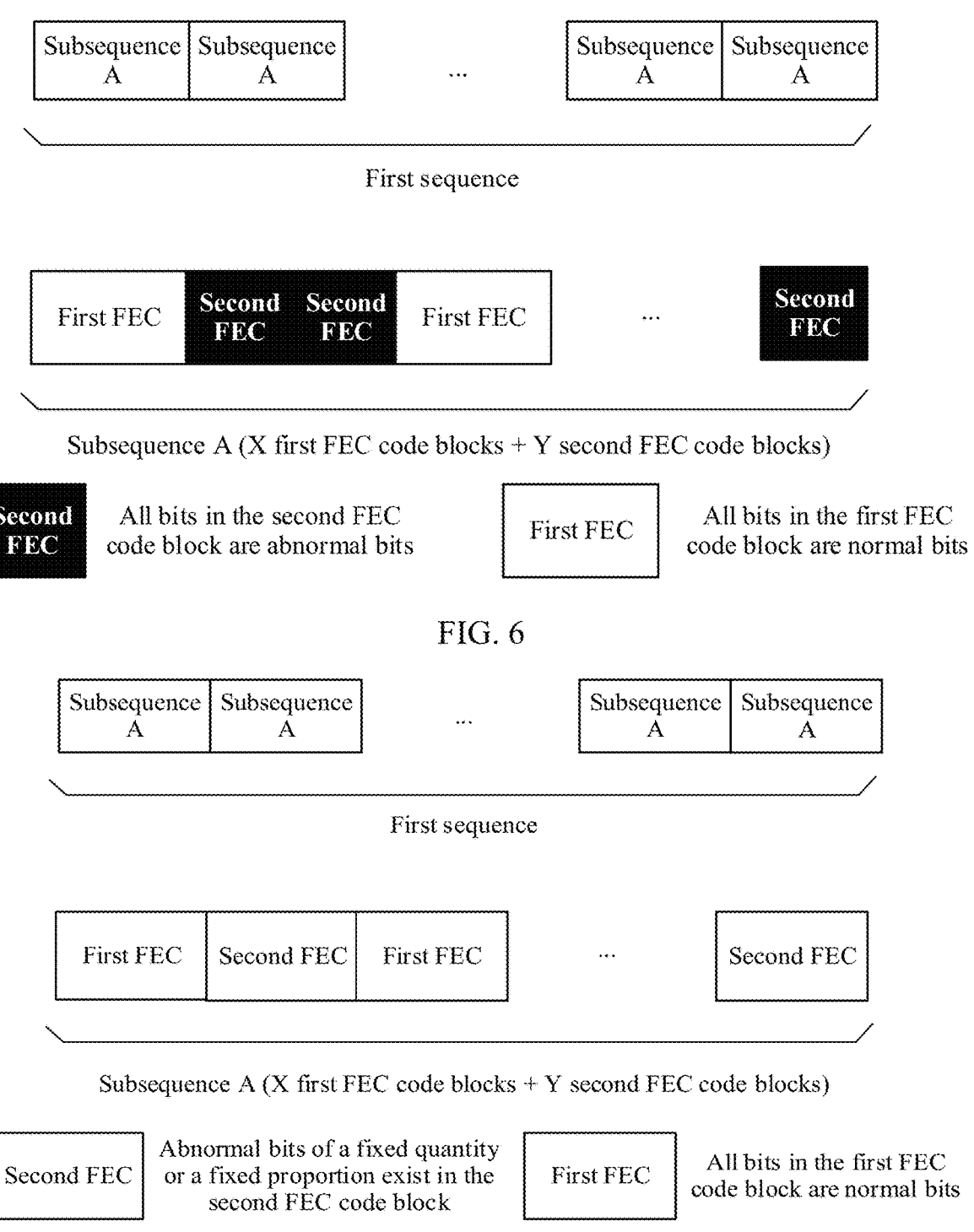
FIG. 6 is an example diagram of a structure of a 2$^{nd}$ first sequence according to this disclosure.
FIG. 7 is an example diagram of a structure of a 2$^{nd}$ first sequence according to this disclosure.

Construction manner 2: As shown in FIG. 6, the first sequence includes P subsequences A, each subsequence A includes X first FEC code blocks and Y second FEC code blocks, all bits in a data element sequence of the first FEC code block are normal bits, and all bits in a data element sequence of the second FEC code block are abnormal bits. P is a positive integer, and represents a quantity of subsequences A in the first sequence.

In addition, positions of the subsequences A in the first sequence may be further represented by using 1 to P. For brief description, refer to content of the construction manner 1. X is a positive integer, and represents a quantity of first FEC code blocks included in one subsequence A. Y is a positive integer, and represents a quantity of second FEC code blocks included in one subsequence A.

For example, it is assumed that P is 5, X is 3, and Y is 2. In this case, the first sequence in FIG. 6 may include five subsequences A, and each subsequence A includes three first FEC code blocks and two second FEC code blocks.

It should be noted that arrangement positions of the first sequence and the second sequence shown in FIG. 6 are merely an example. In this embodiment of this disclosure, positions of the first FEC code blocks and the second FEC code blocks in the subsequence A are not limited, and the first FEC code blocks and the second FEC code blocks may be randomly arranged.

In this embodiment of this disclosure, because the subsequence A includes X first FEC code blocks and Y second FEC code blocks, it may be understood that one first FEC code block and one second FEC code block are minimum repetition units in the first sequence. In other words, a length of the first FEC code block in this embodiment of this disclosure may be the same as a length of the second FEC code block.

For example, it is assumed that the first FEC code block and the second FEC code block each are constituted by the RS-FEC (384, 354, 9) code block whose length is 3456 bits, where 0 represents an abnormal bit, and 1 represents a normal bit. In this case, all the bits in the data element sequence of the first FEC code block are 1, and all the bits in the data element sequence of the second FEC code block are 0.

It is assumed that the subsequence A includes three first FEC code blocks (a1 for short for ease of description) and one second FEC code block (a2 for short for ease of description), and the subsequence A may be represented as a1, a1, a2, and a1. When the first sequence includes two subsequences A, the first sequence may be represented as a1, a1, a2, a1, a1, a1, a2, a1. Because lengths of the first FEC code block and the second FEC code block are 3456 bits, and the subsequence A includes three first FEC code blocks and one second FEC code block, a total quantity of bits included in the subsequence A is 3456×4=13824, and a quantity of abnormal bits included in the subsequence A is 3456. Because the first sequence includes two subsequences A, a total quantity of bits included in the first sequence is 13824×2=27648, and a quantity of abnormal bits included in the first sequence is 6912.

According to the construction manner 2, in this embodiment of this disclosure, the quantity of second FEC code blocks in the first sequence may be further adjusted to correspond to different first preset BERs.

Optionally, in this embodiment of this disclosure, a value of Y or a ratio of Y to (X+Y) in the first sequence may be adjusted to correspond to different first preset BERs.

For example, when the value of Y in the subsequence A is Y1, a corresponding first preset BER is a BER 1, and when the value of Y in the subsequence A is Y2, a corresponding first preset BER is a BER 2. When test equipment wants to set the first preset BER to the BER 1, the value of Y in the subsequence A may be adjusted to Y1.

For another example, when the ratio of Y to (X+Y) in the subsequence A is a first ratio, a corresponding first preset BER is a BER 3, and when the ratio of Y to (X+Y) in the subsequence A is a second ratio, a corresponding first preset BER is a BER 4. When test equipment wants to set the first preset BER to the BER 3, the ratio of Y to (X+Y) in the subsequence A may be adjusted to the first ratio.

Optionally, in this embodiment of this disclosure, the first preset BER corresponding to the first sequence may be determined according to the following formula 2:

$$\text{First preset } BER = Y/(X + Y) \qquad \text{Formula 2}$$

X represents a quantity of first FEC code blocks included in one subsequence A, and Y represents a quantity of second FEC code blocks included in one subsequence A.

In a case, in this embodiment of this disclosure, all the bits included in the data element sequence of the first FEC code block may be set to normal bits, and all the bits included in the data element sequence of the second FEC code block may be set to abnormal bits.

For example, it is assumed that the subsequence A in the first sequence includes 963 first FEC code blocks, that is, a value of X is 963, and all the bits in the data element sequence in the first FEC code block are normal bits, and the subsequence A includes 37 second FEC code blocks, that is, the value of Y is 37, and all the bits in the data element sequence in the second FEC code block are abnormal bits. A length of the data element sequence of the first FEC code block is consistent with a length of the data element sequence of the second FEC code block.

In this case, the value of X that is 963 and the value of Y that is 37 are substituted into the formula 2, and it may be obtained that the first preset BER corresponding to the first sequence is 3.7% (Y/(X+Y)=37/(37+963)=3.7%).

In another case, in this embodiment of this disclosure, all bits included in the data element sequence and a redundant element sequence of the first FEC code block may be set to normal bits, and all bits included in the data element sequence and a redundant element sequence of the second FEC code block may be set to abnormal bits.

For example, it is assumed that the subsequence A in the first sequence includes 963 first FEC code blocks, that is, a value of X is 963, and all the bits in the data element sequence and the redundant element sequence in the first FEC code block are normal bits, and the subsequence A includes 37 second FEC code blocks, that is, the value of Y is 37, and all the bits in the data element sequence and the redundant element sequence in the second FEC code block are abnormal bits.

In this case, the value of X that is 963 and the value of Y that is 37 are substituted into the formula 2, and it may be obtained that the first preset BER corresponding to the first sequence is 3.7% (Y/(X+Y)=37/(37+963)=3.7%).

According to the construction manner 2, in this disclosure, all bits included in the second FEC code block are set to abnormal bits, and it may be obtained that the first preset BER can be more conveniently adjusted, and a calculation process of determining the first preset BER is simplified.

Construction manner 3: As shown in FIG. 7, the first sequence includes P subsequences A, and each subsequence A includes X first FEC code blocks and Y second FEC code blocks. All bits in a data element sequence of the first FEC code block are normal bits, and abnormal bits of a fixed quantity exist in a data element sequence of the second FEC code block, or abnormal bits of a fixed proportion exist in a data element sequence of the second FEC code block.

For example, it is assumed that 0 represents an abnormal bit, 1 represents a normal bit, the first FEC code block and the second FEC code block each are constituted by the RS-FEC (384, 354, 9) code block whose length is 3456 bits, all bits in the data element sequence of the first FEC code block are 1, and abnormal bits of a fixed quantity 5 exist in the data element sequence of the second FEC code block. In this case, the second FEC code block may be 111 . . . 1000001, 111 . . . 1010000, 111 . . . 0001001, or the like. In other words, it is ensured that the quantity of abnormal bits in the data element sequence of the second FEC code block is 5.

It is assumed that the subsequence A includes three first FEC code blocks (a1 for short for ease of description) and one second FEC code block (a3 for short for ease of description), and the subsequence A may be represented as a1, a3, a1, and a1. When the first sequence includes two subsequences A, the first sequence may be represented as a1, a3, a1, a1, a1, a3, a1, a1. Because lengths of the first FEC code block and the second FEC code block are 3456 bits, and the subsequence A includes three first FEC code blocks and one second FEC code block, a total quantity of bits included in the subsequence A is 3456×4=13824. Because all the bits in the data element sequence of the first FEC code block are 1, and the abnormal bits of the fixed quantity 5 exist in the data element sequence of the second FEC code block, a quantity of abnormal bits included in the subsequence A is 5. Because the first sequence includes two subsequences A, a total quantity of bits included in the first sequence is 13824×2=27648, and a quantity of abnormal bits included in the first sequence is 10.

According to the construction manner 3, in this embodiment of this disclosure, the quantity of second FEC code blocks in the first sequence may be further adjusted to correspond to different first preset BERs.

Optionally, in this embodiment of this disclosure, a value of Y or a ratio of Y to (X+Y) in the first sequence may be adjusted to correspond to different first preset BERs.

For example, when the value of Y in the subsequence A is Y1, a corresponding first preset BER is a BER 1, and when the value of Y in the subsequence A is Y2, a corresponding first preset BER is a BER 2. When test equipment wants to set the first preset BER to the BER 1, the value of Y in the subsequence A may be adjusted to Y1.

For another example, when the ratio of Y to (X+Y) in the subsequence A is a first ratio, a corresponding first preset BER is a BER 3, and when the ratio of Y to (X+Y) in the subsequence A is a second ratio, a corresponding first preset BER is a BER 4. When test equipment wants to set the first preset BER to the BER 3, the ratio of Y to (X+Y) in the subsequence A may be adjusted to the first ratio.

Optionally, in this embodiment of this disclosure, the first preset BER corresponding to the first sequence may be determined according to the following formula 3:

$$\text{First preset BER} = T \times Y/(X+Y) \qquad \text{Formula 3}$$

X represents a quantity of first FEC code blocks included in one subsequence A, T represents a proportion of abnormal bits in the first FEC code block, and Y represents a quantity of second FEC code blocks included in one subsequence A.

In a case, in this embodiment of this disclosure, all the bits included in the data element sequence of the first FEC code block may be set to normal bits, and the bits of the fixed quantity or the fixed proportion that are included in the data element sequence of the second FEC code block may be set to abnormal bits.

For example, it is assumed that the subsequence A in the first sequence includes 963 first FEC code blocks, that is, a value of X is 963, and all the bits in the data element sequence in the first FEC code block are normal bits, and the subsequence A includes 74 second FEC code blocks, that is, the value of Y is 74, and 50% of bits in the data element sequence in the second FEC code block are abnormal bits. A length of the data element sequence of the first FEC code block is consistent with a length of the data element sequence of the second FEC code block.

In this case, the value of X that is 963, the value of Y that is 74, and a value of T that is 50% are substituted into the formula 3, and it may be obtained that the first preset BER corresponding to the first sequence is 3.5% (T×Y/(X+Y) =74×50%/(74+963)=3.5%).

In another case, in this embodiment of this disclosure, all bits included in the data element sequence and a redundant element sequence of the first FEC code block may be set to normal bits, and bits of a fixed quantity or a fixed proportion that are included in the data element sequence and a redundant element sequence of the second FEC code block may be set to abnormal bits.

For example, it is assumed that the subsequence A in the first sequence includes 963 first FEC code blocks, that is, a value of X is 963, and all the bits in the data element sequence and the redundant element sequence in the first FEC code block are normal bits, and the subsequence A includes 74 second FEC code blocks, that is, the value of Y is 74, and the quantity of abnormal bits in the second FEC code blocks accounts for 50% of a total quantity of bits in the data element sequence and the redundant element sequence.

In this case, the value of X that is 963, the value of Y that is 74, and a value of T that is 50% are substituted into the formula 3, and it may be obtained that the first preset BER corresponding to the first sequence is 3.5% (T×Y/(X+Y) =74×50%/(74+963)=3.5%).

According to the construction manner 3, in this disclosure, when the first preset BER needs to be adjusted, in one manner, the value of Y in the subsequence A may be adjusted, to flexibly construct a first sequence that matches the first preset BER and that is used to perform the function test. Alternatively, when a new first sequence needs to be set in this disclosure, the value of Y in the subsequence A may be adjusted, to obtain the new first sequence. In this disclosure, when the first preset BER needs to be adjusted, in another manner, the ratio of Y to (X+Y) in the subsequence A is adjusted, to flexibly construct a first sequence that matches the first preset BER and that is used to perform the function test. Alternatively, when a new first sequence needs to be set in this disclosure, the ratio of Y to (X+Y) in the subsequence A may be adjusted, to obtain the new first sequence.

Further, the second FEC code block in the construction manner 3 may also be referred to as an uncorrectable FEC code block, and is a sequence having a length equal to that of the first FEC code block. A quantity of error elements in the second FEC code block exceeds an upper limit of error-correctable elements of the FEC code block.

For example, it is assumed that the RS-FEC (384, 354, 9) is used as one FEC code block. Normally, one RS-FEC code block includes 354 data elements, and 30 corresponding redundant elements are generated according to an encoding rule. More than 15 elements, that is, half $((384-354)/2=15)$ of the redundant elements generated according to the normal encoding rule, may be selected from the 354 data elements of the RS-FEC code block and replaced with error elements (namely, abnormal bits), to obtain a new RS-FEC code block.

In this case, 354 correct valid data elements cannot be recovered through RS-FEC decoding correction. For example, all bits in the RS-FEC code block are replaced with error elements, where 1 represents the error element. In this case, the new RS-FEC code block is an all-1 sequence with a length of 3456 (that is, $384 \times 9 - 3456$). In this way, an error RS-FEC code block that cannot be corrected through decoding is constituted.

It should be noted that theoretically, there are many other non-all-1 sequences that meet the condition. This is not limited in this embodiment of this disclosure.

To better describe the communication method provided in this disclosure, based on the content shown in FIG. 3, the following two scenarios are further described in detail.

Some steps in the following scenarios may be optional, and a step sequence does not represent an actual execution sequence. Therefore, this disclosure is not limited to completely performing the following steps and sequences.

Scenario 1: The second device sends the first sequence and the second sequence together to the first device.

Figure 8:
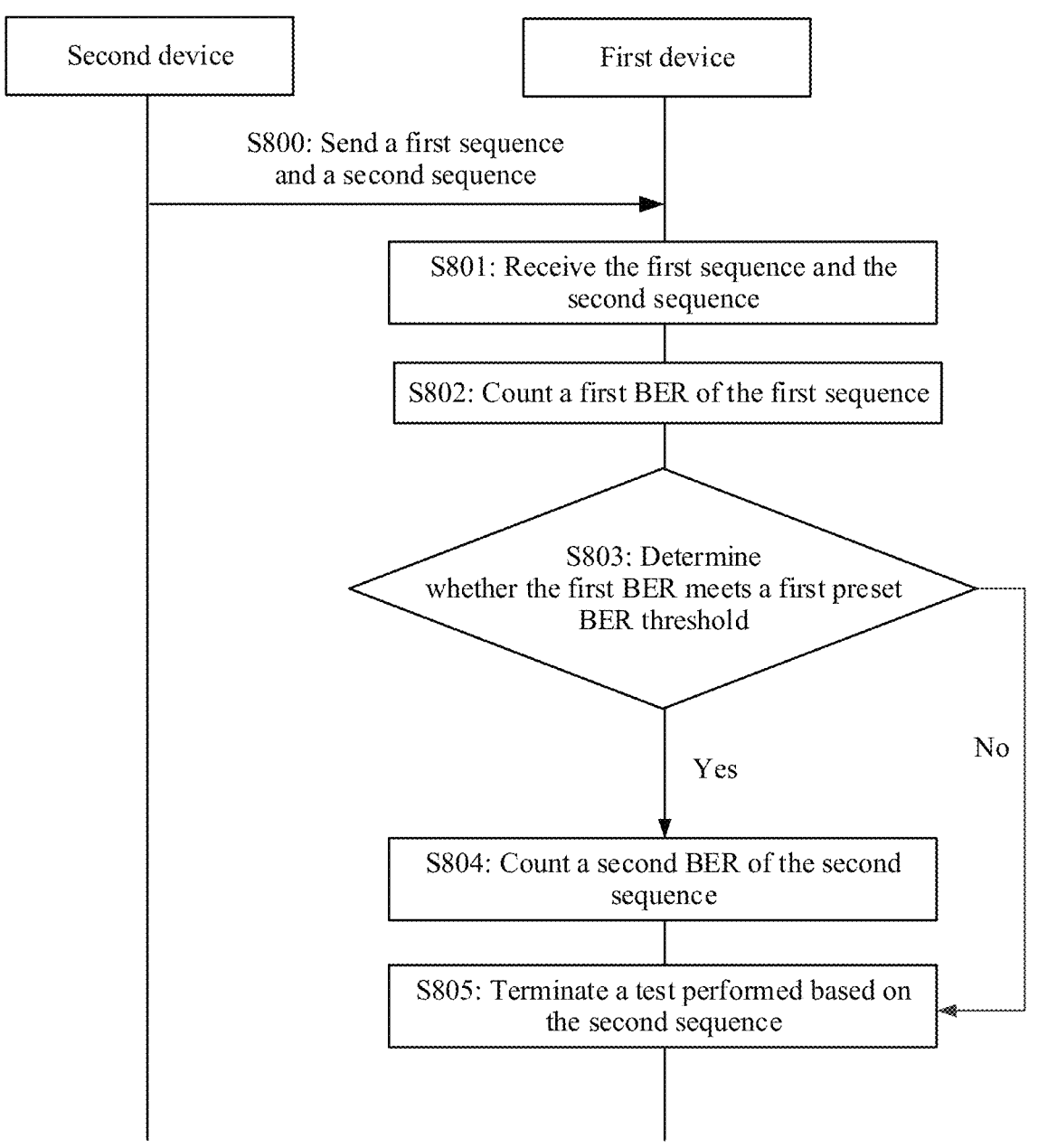
FIG. 8 is a schematic flowchart of a second communication method according to this disclosure.

Refer to FIG. 8. The following steps may be performed in a communication method corresponding to the scenario 1.

S800: The second device sends the first sequence and the second sequence to the first device.

S801: The first device receives the first sequence and the second sequence from the second device.

S802: The first device counts the first BER of the received first sequence.

S803: The first device determines whether the first BER meets the first preset BER, where if the first BER meets the first preset BER, S804 is performed, or if the first BER does not meet the first preset BER, S805 is performed.

It should be noted that, in this embodiment of this disclosure, test personnel may determine, based on the first BER output by the first device, whether the first BER obtained by the first device meets the first preset BER, or the first device may transmit the first BER back to the second device, and the second device determines whether the first BER meets the first preset BER, and then notifies the first device or the test personnel of a determining result.

Content in S803 in this embodiment of this disclosure is merely used as an example for description, and does not constitute a limitation on this embodiment of this disclosure.

S804: The first device counts the second BER of the received second sequence.

Further, the first device may output the second BER, so that the test personnel determine, based on the second BER, whether the first device passes the performance test.

For example, if the test personnel determine that the second BER does not meet the second preset BER, it is determined that the first device does not pass the performance test, or if the test personnel determine that the second BER meets the second preset BER, it is determined that the first device passes the performance test.

S805: The first device terminates a subsequent test performed based on the received second sequence.

Optionally, when determining that the first BER does not meet the first preset BER, the first device may prompt, by using a voice, the test personnel that the first device does not pass the function test.

Scenario 2: After the first BER meets the first preset BER, the second device is triggered to send the second sequence to the first device.

Figure 9:
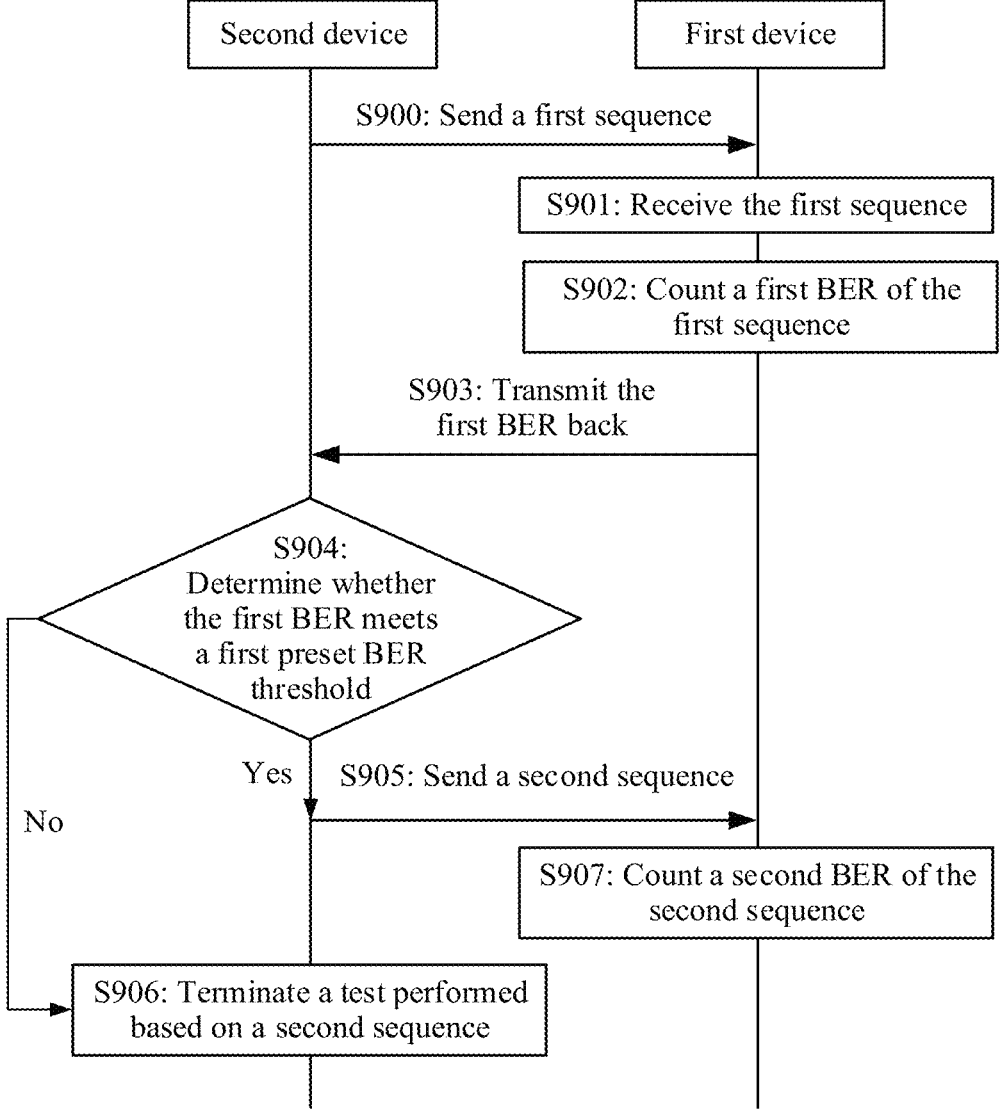
FIG. 9 is a schematic flowchart of a third communication method according to this disclosure.

Refer to FIG. 9. The following steps may be performed in a communication method corresponding to the scenario 2.

S900: The second device sends the first sequence to the first device.

S901: The first device receives the first sequence from the second device.

S902: The first device counts the first BER of the received first sequence.

S903: The first device transmits the first BER back to the second device.

S904: The second device determines whether the first BER meets the first preset BER, where if the first BER meets the first preset BER, S905 is performed, or if the first BER does not meet the first preset BER, S906 is performed.

It should be noted that, in this embodiment of this disclosure, alternatively, the test personnel may determine, based on the first BER output by the first device, whether the first BER obtained by the first device meets the first preset BER.

Content in S903 and S904 in this embodiment of this disclosure is merely used as an example for description, and S903 and S904 may be optional steps, and do not constitute a limitation on this embodiment of this disclosure. For example, after the first device obtains the first BER through counting based on the received first sequence, in this embodiment of this disclosure, the test personnel may determine, based on the first BER output by the first device, whether the first BER obtained by the first device meets the first preset BER. In this case, steps S903 and S904 may be omitted.

S905: The second device sends the second sequence to the first device, and continues to perform S907.

Optionally, in this embodiment of this disclosure, the test personnel may trigger the second device to send the second sequence to the first device. For example, after the first device obtains the first BER through counting based on the received first sequence, in this embodiment of this disclosure, the test personnel may determine, based on the first BER output by the first device, whether the first BER obtained by the first device meets the first preset BER, and when determining that the first BER meets the first preset BER, trigger the second device to send the second sequence to the first device.

Optionally, in this embodiment of this disclosure, alternatively, the second device may automatically trigger sending of the second sequence to the first device. For example, the first device transmits the first BER back to the second device, and the second device determines whether the first BER meets the first preset BER, and when determining that the first BER meets the first preset BER, the second device triggers the second device to send the second sequence to the first device. In addition, in this embodiment of this disclosure, when determining that the first BER meets the first preset BER, the second device may prompt, by using a voice, the test personnel that the device under test (namely, the first device) passes the function test.

S906: The second device determines to terminate a subsequent test performed based on the second sequence.

Optionally, in this embodiment of this disclosure, the test personnel may trigger the second device to terminate the subsequent test performed based on the second sequence. For example, after the first device obtains the first BER through counting based on the received first sequence, in this embodiment of this disclosure, the test personnel may determine, based on the first BER output by the first device, whether the first BER obtained by the first device meets the first preset BER, and when determining that the first BER does not meet the first preset BER, trigger the second device to terminate the subsequent test performed based on the second sequence.

Optionally, in this embodiment of this disclosure, alternatively, the second device may automatically trigger termination of the subsequent test performed based on the second sequence. For example, the first device transmits the first BER back to the second device, and the second device determines whether the first BER meets the first preset BER, and when determining that the first BER does not meet the first preset BER, the second device triggers termination of the subsequent test performed based on the second sequence.

In addition, in this embodiment of this disclosure, when determining that the first BER does not meet the first preset BER, the second device may prompt, by using a voice, the test personnel that the device under test (namely, the first device) does not pass the function test.

S907: The first device counts the second BER of the received second sequence.

Further, the first device may output the second BER, so that the test personnel determine, based on the second BER, whether the first device passes the performance test.

For example, if the test personnel determine that the second BER does not meet the second preset BER, it is determined that the first device does not pass the performance test, or if the test personnel determine that the second BER meets the second preset BER, it is determined that the first device passes the performance test.

In addition, in this embodiment of this disclosure, to effectively ensure that a test result obtained by the first device is accurate and reliable, before a second sequence test is performed, the first sequence may be sent to the first device a plurality of times to perform a test. In other words, the function test is performed on the first device a plurality of times. The first sequence sent each time may be the same or may be different. This is not further limited in this embodiment of this disclosure.

When the function test is performed on the first device a plurality of times, and a proportion (namely, a pass rate) of a quantity of times of passing the function test to a total quantity of times of performing the function test meets a threshold proportion, the second sequence test is performed on the first device. In other words, the performance test is performed on the first device.

For example, it is assumed that the threshold proportion is 80%, the total quantity of performing the function test on the first device is 10, the quantity of times that the first device passes the function test is 9, and a pass rate is 90%, which is greater than the threshold proportion 80%. In this case, it may be determined that the test result obtained by the first device is accurate and reliable, and the subsequent performance test may be performed.

Further, in this embodiment of this disclosure, before performing the content of the scenario 1 or the scenario 2, the second device may further send at least one training sequence to the first device, and perform receive link training with the first device by using the training sequence, so that receive parameters of the first device converge. In this way, in a subsequent test process, the test process is smoother and more stable.

The methods and the apparatuses are conceived based on a same or similar technical concept. The methods and the apparatuses have similar principles for resolving the problems. Therefore, for implementations of the apparatuses and the methods, refer to each other. Details of repeated parts are not described.

The terms "apparatus" and "device" may be used interchangeably in embodiments of this disclosure. In descriptions of embodiments of this disclosure, the term "and/or" describes an association relationship between associated objects and indicates that three relationships may exist. For example, A and/or B may indicate the following three cases: only A exists, both A and B exist, and only B exists. The character "/" generally represents an "or" relationship between the associated objects. In this disclosure, "at least one" means one or more, and "a plurality of" means two or more.

In addition, it should be understood that, in the description of this disclosure, terms such as "first", "second", and "third" are merely used for distinguishing and description, but should not be understood as an indication or implication of relative importance, or should not be understood as an indication or implication of a sequence. Reference to "an embodiment", "some embodiments", or the like described in this specification indicates that one or more embodiments of this disclosure include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise further emphasized in another manner. The terms "include", "contain", "have", and their variants all mean "include but are not limited to", unless otherwise further emphasized.

The apparatuses provided in embodiments of this disclosure are described below in detail with reference to FIG. 10 and FIG. 11. It should be understood that descriptions of the apparatus embodiments correspond to descriptions of the method embodiments. Therefore, for content that is not described in detail, refer to each other.

Figure 10:
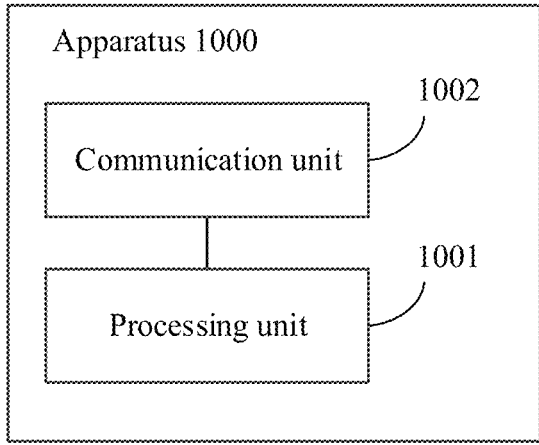
FIG. 10 is a schematic diagram of a structure of an apparatus according to this disclosure.

FIG. 10 is a schematic block diagram of an apparatus 1000 according to an embodiment of this disclosure. The apparatus 1000 is configured to implement functions of the first device or the second device in the method embodiments. For example, the apparatus may be a software module or a chip system. The chip may include a chip, or may include a chip and another discrete component. The apparatus 1000 includes a processing unit 1001 and a communication unit 1002. The communication unit 1002 is configured to communicate with another device, and may also be referred to as a communication interface, a transceiver unit, an input/output interface, or the like.

In some embodiments, the apparatus 1000 may be the first device, or a chip, a circuit, or the like configured in the first device. The processing unit 1001 may be configured to perform a processing-related operation of the first device in the method embodiments. The communication unit 1002 is configured to perform receiving and sending-related operations of the first device in the method embodiments. For example, the communication unit 1002 in this embodiment of this disclosure may be a receiving unit.

For example, the communication unit 1002 is configured to receive a first sequence sent by the second device, where the first sequence includes P subsequences A, and the subsequence A is constituted by one or more FEC code blocks, the processing unit 1001 is configured to count a first BER of the received first sequence, the communication unit 1002 is configured to receive a second sequence sent by the second device, where the second sequence includes Q subsequences B, and the subsequence B is constituted by one or more FEC code blocks, and the processing unit 1001 is configured to count a second BER of the received second sequence, where a length of the second sequence is greater than or equal to a length of the first sequence, and P and Q are positive integers.

In an optional manner, the processing unit 1001 is further configured to, when the first BER meets a first preset BER, count the second BER of the received second sequence.

In an optional manner, the processing unit 1001 is further configured to count a quantity of abnormal bits in the received first sequence, or count a ratio of a quantity of abnormal bits in the received first sequence to a total quantity of bits in the received first sequence.

In an optional manner, the processing unit 1001 is further configured to count a quantity of abnormal bits in the received second sequence, or count a ratio of a quantity of abnormal bits in the received second sequence to a total quantity of bits in the received second sequence.

In an optional manner, the subsequence A includes N bits, the subsequence A includes M abnormal bits, and M or a ratio of M to N corresponds to the first preset BER, where N and M are positive integers, and N is greater than or equal to M.

In an optional manner, the N bits are bits included in a valid sequence in the subsequence A, and the M bits are abnormal bits included in the valid sequence in the subsequence A, or the N bits are bits included in a valid sequence and a redundant sequence in the subsequence A, and the M bits are abnormal bits included in the valid sequence and the redundant sequence in the subsequence A. Each of the one or more FEC code blocks includes a data element sequence and a redundant element sequence, the valid sequence in the subsequence A includes the data element sequence of the one or more FEC code blocks, and the redundant sequence in the subsequence A includes the redundant element sequence of the one or more FEC code blocks.

In an optional manner, the subsequence A includes X first FEC code blocks and Y second FEC code blocks, all bits included in a data element sequence of the first FEC code block are normal bits, a data element sequence of the second FEC code block includes abnormal bits of a fixed quantity or abnormal bits of a fixed proportion, and Y or a ratio of Y to (X+Y) corresponds to the first preset BER, where X and Y are positive integers.

In an optional manner, all bits included in the data element sequence of the second FEC code block are abnormal bits.

In an optional manner, all bits included in a redundant element sequence of the first FEC code block are normal bits, and all bits included in a redundant element sequence of the second FEC code block are abnormal bits.

In an optional manner, a length of the subsequence A is equal to a length of the subsequence B.

In an optional manner, when a value of a normal bit is 0, 1 is a value of an abnormal bit, or when a value of a normal bit is 1, 0 is a value of an abnormal bit.

In an optional manner, all bits included in the first FEC code block may be 0, all abnormal bits of a fixed quantity or a fixed proportion in the second FEC code block are 1, and all remaining bits are 0.

In an optional manner, when the value of the normal bit is 0, all bits included in data element sequences of all FEC code blocks in the subsequence B are 0, or when the value of the normal bit is 1, all bits included in data element sequences of all FEC code blocks in the subsequence B are 1.

In an optional manner, before sending the first sequence to the first device, the processing unit 1001 is further configured to perform link training with the first device.

In some other embodiments, the apparatus 1000 may be the second device, or a chip, a circuit, or the like configured in the second device. The processing unit 1001 may be configured to perform a processing-related operation of the second device in the method embodiments. The communication unit 1002 may be configured to perform receiving and sending-related operations of the second device in the method embodiments. For example, the communication unit 1002 in this embodiment of this disclosure may be a sending unit.

For example, the communication unit 1002 is configured to send a first sequence to the first device, where the first sequence is used by the first device to count a first BER, the first sequence includes P subsequences A, and the subsequence A is constituted by one or more FEC code blocks, and send a second sequence to the first device, where the second sequence is used by the first device to count a second BER, the second sequence includes Q subsequences B, the subsequence B is constituted by one or more FEC code blocks, a length of the second sequence is greater than or equal to a length of the first sequence, and P and Q are positive integers.

In an optional manner, the first BER is obtained by recording a quantity of abnormal bits in the first sequence, and the second BER is obtained by recording a quantity of abnormal bits in the second sequence.

In an optional manner, the communication unit 1002 is further configured to, when the first BER meets a first preset BER, send the second sequence to the first device.

In an optional manner, the subsequence A includes N bits, the subsequence A includes M abnormal bits, and M or a ratio of M to N corresponds to the first preset BER, where N and M are positive integers, and N is greater than or equal to M.

In an optional manner, the N bits are bits included in a valid sequence in the subsequence A, and the M bits are abnormal bits included in the valid sequence in the subsequence A, or the N bits are bits included in a valid sequence and a redundant sequence in the subsequence A, and the M bits are abnormal bits included in the valid sequence and the redundant sequence in the subsequence A. Each of the one or more FEC code blocks includes a data element sequence and a redundant element sequence, the valid sequence in the subsequence A includes the data element sequence of the one or more FEC code blocks, and the redundant sequence in the subsequence A includes the redundant element sequence of the one or more FEC code blocks.

In an optional manner, the subsequence A includes X first FEC code blocks and Y second FEC code blocks, all bits included in a data element sequence of the first FEC code block are normal bits, a data element sequence of the second FEC code block includes abnormal bits of a fixed quantity or abnormal bits of a fixed proportion, and Y or a ratio of Y to (X+Y) corresponds to the first preset BER, where X and Y are positive integers.

In an optional manner, all bits included in the data element sequence of the second FEC code block are abnormal bits.

In an optional manner, all bits included in a redundant element sequence of the first FEC code block are normal bits, and all bits included in a redundant element sequence of the second FEC code block are abnormal bits.

In an optional manner, a length of the subsequence A is equal to a length of the subsequence B.

In an optional manner, when a value of a normal bit is 0, 1 is a value of an abnormal bit, or when a value of a normal bit is 1, 0 is a value of an abnormal bit.

In an optional manner, all bits included in the first FEC code block may be 0, all abnormal bits of a fixed quantity or a fixed proportion in the second FEC code block are 1, and all remaining bits are 0.

In an optional manner, when the value of the normal bit is 0, all bits included in all FEC code blocks in the subsequence B are 0, or when the value of the normal bit is 1, all bits included in data element sequences of all FEC code blocks in the subsequence B are 1.

In an optional manner, before sending the first sequence to the first device, the processing unit 1001 is further configured to perform link training with the first device.

In this embodiment of this disclosure, division into the units is an example, and is merely logical function division. In an actual implementation, another division manner may be used. In addition, the functional units in this embodiment of this disclosure may be integrated into one processor, or each of the units may exist alone physically, or two or more units are integrated into one unit. The integrated unit may be implemented in a form of hardware, or may be implemented in a form of a software functional unit.

Figure 11:
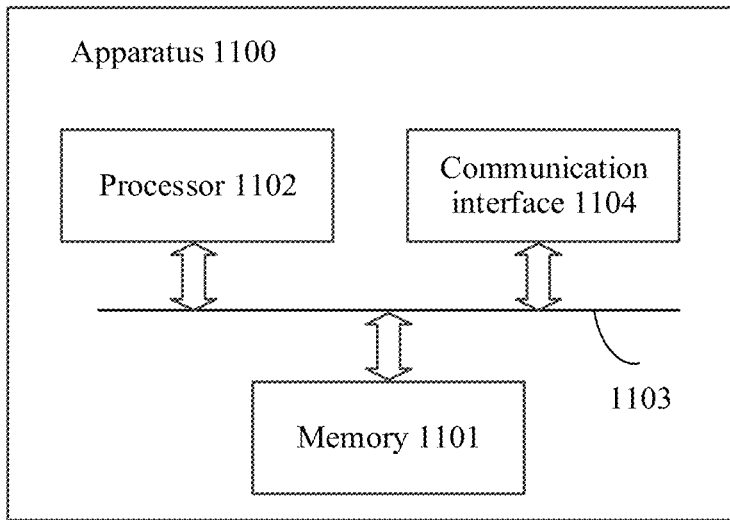
FIG. 11 is a schematic diagram of a structure of an apparatus according to this disclosure.

FIG. 11 is a schematic diagram of an apparatus 1100 according to an embodiment of this disclosure. The apparatus 1100 may be an electronic apparatus or a component in an electronic apparatus, for example, a chip or an integrated circuit. The apparatus 1100 may include at least one processor 1102 and a communication interface 1104. Further, optionally, the apparatus may further include at least one memory 1101. Further, optionally, a bus 1103 may be further included. The memory 1101, the processor 1102, and the communication interface 1104 are connected through the bus 1103.

The memory 1101 is configured to provide storage space, and the storage space may store data such as an operating system and a computer program. The memory 1101 mentioned in this embodiment of this disclosure may be a volatile memory or a non-volatile memory, or may include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), and used as an external cache. By way of example, and not limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct Rambus (DR) RAM.

It should be noted that the memory described in this specification aims to include but is not limited to these memories and any memory of another proper type. The processor 1102 is a module for performing an arithmetic operation and/or a logical operation, and may be one or a combination of a plurality of processing modules such as a central processing unit (CPU), a graphics processing unit (GPU), a microprocessor unit (MPU), an application-specific integrated circuit (ASIC), a field-programmable gate array (FPGA), a complex programmable logic device (CPLD), a synergistic processing unit (assisting the CPU to complete corresponding processing and application), and a microcontroller unit (MCU).

It should be noted that when the processor is a general-purpose processor, an ASIC, an FPGA, or another programmable logic device, a discrete gate or a transistor logic device, or a discrete hardware component, the memory (a storage module) may be integrated into the processor.

The communication interface 1104 may be configured to provide an information input or output for the at least one processor, and/or the communication interface may be configured to receive data sent from the outside and/or send data to the outside, and may be a wired link interface including an Ethernet cable or the like, or may be a wireless link (WI-FI, BLUETOOTH, universal wireless transmission, a vehicle-mounted short-range communication technology, or the like) interface. Optionally, the communication interface 1104 may further include a transmitter (for example, a radio frequency transmitter or an antenna), a receiver, or the like coupled to the interface.

In some embodiments, the apparatus 1100 may be the first device or a component in the first device in the method embodiments, for example, a chip or an integrated circuit. The processor 1102 in the apparatus 1100 is configured to read the computer program stored in the memory 1101, to control the first device to perform the following operations: sending a first sequence to a first device, where the first sequence is used by the first device to count a first BER, the first sequence includes P subsequences A, and the subsequence A is constituted by one or more FEC code blocks, and sending a second sequence to the first device, where the second sequence is used by the first device to count a second BER, the second sequence includes Q subsequences B, the subsequence B is constituted by one or more FEC code blocks, a length of the second sequence is greater than or equal to a length of the first sequence, and P and Q are positive integers.

Optionally, the processor 1102 in the first device may be further configured to read the program in the memory 1101 and perform the method procedure performed by the test equipment in S300 to S305 shown in FIG. 3, or may be further configured to read the program in the memory 1101 and perform the method procedure performed by the test equipment in S800 to S805 shown in FIG. 8, or may be further configured to read the program in the memory 1101 and perform the method procedure performed by the test equipment in S900 to S907 shown in FIG. 9.

For specific details, refer to the descriptions in the method embodiments, and details are not described herein again.

In some other embodiments, the apparatus 1100 may be the second device or a component in the second device in the method embodiments, for example, a chip or an integrated circuit. The processor 1102 in the apparatus 1100 is configured to read the computer program stored in the memory 1101, to control the second device to perform the following operations: receiving a first sequence sent by a second device, where the first sequence includes P subsequences A, and the subsequence A is constituted by one or more FEC code blocks, counting a first BER of the received first sequence, receiving a second sequence sent by the second device, where the second sequence includes Q subsequences B, and the subsequence B is constituted by one or more FEC code blocks, and counting a second BER of the received second sequence, where a length of the second sequence is greater than or equal to a length of the first sequence, and P and Q are positive integers.

Optionally, the processor 1102 in the second device may be further configured to read the program in the memory 1101 and perform the method procedure performed by the device under test in S300 to S305 shown in FIG. 3, or may be further configured to read the program in the memory 1101 and perform the method procedure performed by the device under test in S800 to S805 shown in FIG. 8, or may be further configured to read the program in the memory 1101 and perform the method procedure performed by the device under test in S900 to S907 shown in FIG. 9.

For specific details, refer to the descriptions in the method embodiments, and details are not described herein again.

An embodiment of this disclosure further provides a computer-readable storage medium (including but not limited to a magnetic disk memory, a compact disc (CD) ROM (CD-ROM), an optical memory, and the like), including instructions. When the instructions are run on a computer, the computer is enabled to perform the method described in the foregoing embodiments.

An embodiment of this disclosure further provides a chip system. The chip system includes at least one processor and an interface circuit. Further, optionally, the chip system may further include a memory or an external memory. The processor is configured to execute instructions and/or data interaction through the interface circuit, to implement the method in the foregoing method embodiments. The chip system may include a chip, or may include a chip and another discrete component.

An embodiment of this disclosure further provides a computer program product, including instructions. When the instructions are run on a computer, the computer is enabled to perform the method described in the foregoing embodiments.

All or some of the methods in embodiments of this disclosure may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this disclosure are all or partially generated.

It may be clearly understood by a person skilled in the art that, for convenient and brief description, for a detailed working process of the foregoing system, apparatus, and unit, refer to a corresponding process in the foregoing method embodiments, and details are not described herein again.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

It is clear that a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A method comprising:
sending a first bit sequence having a length of $N_1$ bits to a first device, wherein the first bit sequence comprises P subsequences, each referred to as a subsequence A, and having a length of $N_1/P$ bits, wherein each of the P subsequences A comprises one or more first forward error correction (FEC) code blocks, and wherein P is a positive integer;
obtaining a quantity of abnormal bits in the first bit sequence;
obtaining a first bit error rate (BER) based on the quantity of abnormal bits in the first bit sequence;
sending a second bit sequence having a length of $N_2$ bits to the first device, wherein the second bit sequence comprises Q subsequences, each referred to as a subsequence B, and having a length of $N_2/Q$ bits, wherein $N_2$ is greater than or equal to $N_1$, wherein each of the Q subsequences B comprises one or more second FEC code blocks, wherein Q is a positive integer;
obtaining a quantity of abnormal bits in the second bit sequence;
obtaining a second BER based on the quantity of abnormal bits in the second bit sequence; and
outputting the first BER and the second BER.

2. The method of claim 1, further comprising sending the second bit sequence to the first device when the first BER equals or exceeds a first preset BER threshold.

3. The method of claim 2, wherein the one or more FEC code blocks consist of X third FEC code blocks and Y fourth FEC code blocks, wherein all first bits in a first data element sequence of each of the X third FEC code blocks are normal bits, wherein a second data element sequence of each of the Y fourth FEC code blocks comprises abnormal bits of a fixed quantity or abnormal bits of a fixed proportion, wherein Y or a ratio of Y to (X+Y) corresponds to the first preset BER threshold, and wherein X and Y are positive integers.

4. The method of claim 3, wherein all bits in the second data element sequence of each of the Y fourth FEC code blocks are abnormal bits.

5. A method comprising:
receiving a first bit sequence having a length of $N_1$ bits from a first device, wherein the first bit sequence comprises P subsequences, each referred to as a subsequence A, and having a length of $N_1/P$ bits, wherein each of the P subsequences A comprises one or more first forward error correction (FEC) code blocks, and wherein P is a positive integer;
obtaining a quantity of abnormal bits in the first bit sequence;
obtaining a first bit error rate (BER) based on the quantity of abnormal bits in the first bit sequence;
receiving a second bit sequence having a length of $N_2$ bits from the first device, wherein the second bit sequence comprises Q subsequences, each referred to as a subsequence B, and having a length of $N_2/Q$ bits, wherein $N_2$ is greater than or equal to $N_1$, wherein each of the Q subsequences B comprises one or more second FEC code blocks, and wherein Q is a positive integer;
obtaining a quantity of abnormal bits in the second bit sequence;
obtaining a second BER based on the quantity of abnormal bits in the second bit sequence; and
outputting the first BER and the second BER.

6. The method of claim 5, further comprising obtaining the second BER when the first BER equals or exceeds a first preset BER threshold.

7. The method of claim 6, wherein the one or more first and second FEC code blocks consist of X third FEC code blocks and Y fourth FEC code blocks, wherein all first bits in a first data element sequence of each of the X third FEC code blocks are normal bits, wherein a second data element sequence of each of the Y fourth FEC code blocks comprises abnormal bits of a fixed quantity or abnormal bits of a fixed proportion, wherein Y or a ratio of Y to (X+Y) corresponds to the first preset BER threshold, and wherein X and Y are positive integers.

8. The method of claim 7, wherein all bits in the second data element sequence of each of the Y fourth FEC code blocks are abnormal bits.

9. The method of claim 5, wherein a length of each of the P subsequences A is equal to a length of each of the Q subsequences B.

10. The method of claim 5, wherein 1 is a first value of an abnormal bit when a second value of a normal bit is 0, and wherein 0 is the first value when the second value is 1.

11. The method of claim 10, wherein the second value is 0, wherein all bits in the one or more first FEC code blocks are 0, wherein all abnormal bits of a fixed quantity or a fixed proportion in the one or more second FEC code blocks are 1, and wherein all remaining bits in the one or more second FEC code blocks are 0.

12. The method of claim 5, wherein before receiving the first bit sequence, the method further comprises performing link training with the first device.

13. A test equipment comprising:

a memory configured to store instructions; and at least one processor coupled to the memory and configured to execute the instructions to cause the test equipment to:

send a first bit sequence having a length of $N_1$ bits to a first device, wherein the first bit sequence comprises P subsequences, each referred to as a subsequence A, and having a length of $N_1/P$ bits, wherein each of the P subsequences A comprises one or more first forward error correction (FEC) code blocks, and wherein P is a positive integer;

obtain a quantity of abnormal bits in the first bit sequence;

obtain a first bit error rate (BER) based on the quantity of abnormal bits in the first bit sequence;

send a second bit sequence having a length of $N_2$ bits to the first device, wherein the second bit sequence comprises Q subsequences, each referred to as a subsequence B, and having a length of $N_2/Q$ bits, wherein $N_2$ is greater than or equal to $N_1$, wherein each of the Q subsequences B comprises one or more second FEC code blocks, wherein Q is a positive integer;

obtain a quantity of abnormal bits in the second bit sequence;

obtain a second BER based on the quantity of abnormal bits in the second bit sequence; and output the first BER and the second BER.

14. The test equipment of claim 13, wherein the at least one processor is further configured to execute the instructions to cause the test equipment to send the second bit sequence to the first device when the first BER equals or exceeds a first preset BER threshold.

15. The test equipment of claim 14, wherein the one or more FEC code blocks consist of X third FEC code blocks and Y fourth FEC code blocks, wherein all first bits in a first data element sequence of each of the X third FEC code blocks are normal bits, wherein a second data element sequence of each of the fourth FEC code blocks comprises abnormal bits of a fixed quantity or abnormal bits of a fixed proportion, wherein Y or a ratio of Y to (X+Y) corresponds to the first preset BER threshold, and wherein X and Y are positive integers.

16. The test equipment of claim 15, wherein all bits in the second data element sequence of each of the Y fourth FEC code blocks are abnormal bits.

17. The test equipment of claim 13, wherein a length of each of the P subsequences A is equal to a length of each of the Q subsequences B.

18. The test equipment of claim 13, wherein 1 is a first value of an abnormal bit when a second value of a normal bit is 0; and wherein 0 is the first value when the second value is 1.

19. The test equipment of claim 18, wherein the second value is 0, wherein all bits in the one or more first FEC code blocks are 0, wherein all abnormal bits of a fixed quantity or a fixed proportion in the one or more second FEC code blocks are 1, and wherein all remaining bits in the one or more second FEC code blocks are 0.

20. The test equipment of claim 13, wherein the at least one processor is further configured to execute the instructions to cause the test equipment to perform link training with the first device.

* * * * *